(12) United States Patent
Lee et al.

(10) Patent No.: US 11,959,216 B2
(45) Date of Patent: Apr. 16, 2024

(54) WASHING MACHINE AND CONTROL METHOD THEREOF

(71) Applicant: SAMSUNG ELECTRONICS CO., LTD., Suwon-si (KR)

(72) Inventors: Sungmo Lee, Suwon-si (KR); Junhyun Park, Suwon-si (KR); Seokmo Chang, Suwon-si (KR); Jeonghoon Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 140 days.

(21) Appl. No.: 16/939,336

(22) Filed: Jul. 27, 2020

(65) Prior Publication Data
US 2021/0025097 A1 Jan. 28, 2021

(30) Foreign Application Priority Data

Jul. 26, 2019 (KR) .................. 10-2019-0090730

(51) Int. Cl.
*D06F 34/18* (2020.01)
*D06F 23/04* (2006.01)
(Continued)

(52) U.S. Cl.
CPC .............. *D06F 34/18* (2020.02); *D06F 23/04* (2013.01); *D06F 33/32* (2020.02); *D06F 34/04* (2020.02); *G06V 10/751* (2022.01); *G06V 20/52* (2022.01); *H04N 7/188* (2013.01); *D06F 2103/02* (2020.02); *D06F 2105/48* (2020.02); *G06V 10/759* (2022.01)

(58) Field of Classification Search
CPC .......... D06F 34/18; D06F 23/04; D06F 33/32; D06F 34/04; D06F 2103/02;
(Continued)

(56) References Cited

U.S. PATENT DOCUMENTS

2010/0205825 A1 8/2010 Ashrafzadeh et al.
2011/0067186 A1 3/2011 Johansson
(Continued)

FOREIGN PATENT DOCUMENTS

EP 3 309 285 A1 4/2018
EP 3 540 111 A1 9/2019
(Continued)

OTHER PUBLICATIONS

International Search Report dated Nov. 19, 2020 in International Patent Application No. PCT/KR2020/009775.
(Continued)

*Primary Examiner* — Michael E Barr
*Assistant Examiner* — Pallavi Chitta
(74) *Attorney, Agent, or Firm* — STAAS & HALSEY LLP

(57) ABSTRACT

Disclosed herein is a washing machine capable of identifying whether laundry of an inner tub includes waterproof clothing. The washing machine includes a cabinet provided with an opening at an upper portion thereof, an outer tub provided in the cabinet, an inner tub provided in the outer tub, a motor configured to rotate the inner tub, a camera configured to capture an image of an inside of the inner tub, and a controller configured to control the motor to increase a rotational speed of the inner tub to a first rotational speed during spinning. The controller is configured to control the motor to set the rotational speed of the inner tub to a second rotational speed, which is less than the first rotational speed, based on the image of the inside of the inner tub captured by the camera during the spinning.

10 Claims, 26 Drawing Sheets

(51) Int. Cl.
  *D06F 33/32* (2020.01)
  *D06F 34/04* (2020.01)
  *G06V 10/75* (2022.01)
  *G06V 20/52* (2022.01)
  *H04N 7/18* (2006.01)
  *D06F 103/02* (2020.01)
  *D06F 105/48* (2020.01)

(58) Field of Classification Search
  CPC ...... D06F 2105/48; D06F 33/47; D06F 33/48; D06F 34/05; D06F 34/16; D06F 2103/06; D06F 33/40; D06F 2105/58; D06F 34/28; D06F 37/304; D06F 37/36; D06F 37/42; D06F 39/02; G06V 10/25; G06V 20/00; G06V 10/751; G06V 20/52; G06V 10/759; H04N 7/188; H04N 5/2253
  See application file for complete search history.

(56) References Cited

U.S. PATENT DOCUMENTS

| | | | |
|---|---|---|---|
| 2014/0352077 A1 | 12/2014 | Leitert et al. | |
| 2015/0347847 A1* | 12/2015 | Cho | G06V 10/44 |
| | | | 382/103 |
| 2019/0032271 A1 | 1/2019 | Ashrafzadeh et al. | |
| 2021/0207304 A1* | 7/2021 | Kim | D06F 39/00 |

FOREIGN PATENT DOCUMENTS

| | | |
|---|---|---|
| JP | 2002-136793 | 5/2002 |
| JP | 2003-154191 | 5/2003 |
| JP | 2009-240456 | 10/2009 |
| JP | 2019-122535 | 7/2019 |
| KR | 10-2016-0061696 | 6/2016 |
| KR | 20160061696 A * | 6/2016 |
| KR | 10-2016-0084698 | 7/2016 |
| KR | 10-2017-0090162 | 8/2017 |
| KR | 10-2019-0026517 | 3/2019 |
| KR | 10-2019-0028617 | 3/2019 |

OTHER PUBLICATIONS

Extended European Search Report dated Jul. 20, 2022 in European PatentApplication No. 208467548 (6 pages).
Office Action dated Aug. 18, 2023 in Chinese Patent Application No. 202080054170.1.
Office Action dated Jan. 3, 2024 in European Patent Application No. 20 846 754.8.

* cited by examiner

ROI

WASHING MACHINE AND CONTROL METHOD THEREOF

CROSS-REFERENCE TO RELATED APPLICATION(S)

This application is based on and claims priority under 35 U.S.C. § 119 to Korean Patent Application No. 10-2019-0090730, filed on Jul. 26, 2019, in the Korean Intellectual Property Office, the disclosure of which is incorporated by reference herein in its entirety

BACKGROUND

1. Field

The disclosure relates to a washing machine and a control method thereof, and more particularly, to a washing machine capable of identifying laundry and a control method thereof.

2. Description of Related Art

In general, a washing machine is a device including an outer tub in which water is stored and an inner tub rotatably installed in the outer tub, and the washing machine is capable of washing laundry by rotating the inner tub, in which water and laundry are placed, in the outer tub.

The washing machine may perform a washing cycle for washing laundry, a rinsing cycle for rinsing the laundry, and a spinning cycle for spinning the laundry.

In particular, in the spinning cycle, water absorbed in the laundry may be separated from the laundry by rotating the inner tub containing the laundry at about 1000 revolution per minute (rpm).

Recently, bedding made of a waterproof material has been widely used for pest control. Further, clothing made of a waterproof material has been popular due to increase in the outdoor activity.

However, bedding made of a waterproof material or clothing made of a waterproof material (hereinafter referred to as a "waterproof clothing") may damage the washing machine during the spinning cycle. For example, while water is drained after washing and/or rinsing, the waterproof clothing may trap water like a bag. While the inner tub is rotated at a high speed for spinning after draining, weight imbalance may occur caused by water trapped by the waterproof clothing. Further, the washing machine may be damaged because the inner tub and the outer tub greatly are vibrated due to weight imbalance.

SUMMARY

In accordance with an aspect of the disclosure, a washing machine includes a cabinet provided with an opening at an upper portion thereof, an outer tub provided in the cabinet, an inner tub provided in the outer tub, a motor configured to rotate the inner tub, a camera configured to capture an image of an inside of the inner tub, and a controller configured to control the motor to increase a rotational speed of the inner tub to a first rotational speed during spinning. The controller is configured to control the motor to limit the rotational speed of the inner tub to a second rotational speed, which is less than the first rotational speed, based on the image of the inside of the inner tub captured by the camera during the spinning.

In accordance with another aspect of the disclosure, a control method of a washing machine including a cabinet provided with an opening at an upper portion thereof, an outer tub provided in the cabinet, and an inner tub provided in the outer tub, the control method includes increasing a rotational speed of the inner tub to a first rotational speed during spinning, capturing an image of an inside of the inner tub by a camera installed on an inner wall of the opening during the spinning, and limiting the rotational speed of the inner tub to a second rotational speed, which is less than the first rotational speed, based on the image of the inside of the inner tub captured by the camera during the spinning.

In accordance with an aspect of the disclosure, a washing machine includes a cabinet provided with an opening at an upper portion thereof, an outer tub provided in the cabinet, an inner tub provided in the outer tub, a motor configured to rotate the inner tub, a camera configured to capture an image of an inside of the inner tub, a processor electrically connected to the camera and the motor, and a memory configured to store at least one instructions. The memory stores at least one instructions configured to allow the processor to: control the motor to increase a rotational speed of the inner tub to a first rotational speed during spinning, and control the motor to limit the rotational speed of the inner tub to a second rotational speed, which is less than the first rotational speed, based on the image of the inside of the inner tub captured by the camera during the spinning.

Additional aspects of the disclosure will be set forth in part in the description which follows and, in part, will be obvious from the description, or may be learned by practice of the disclosure.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
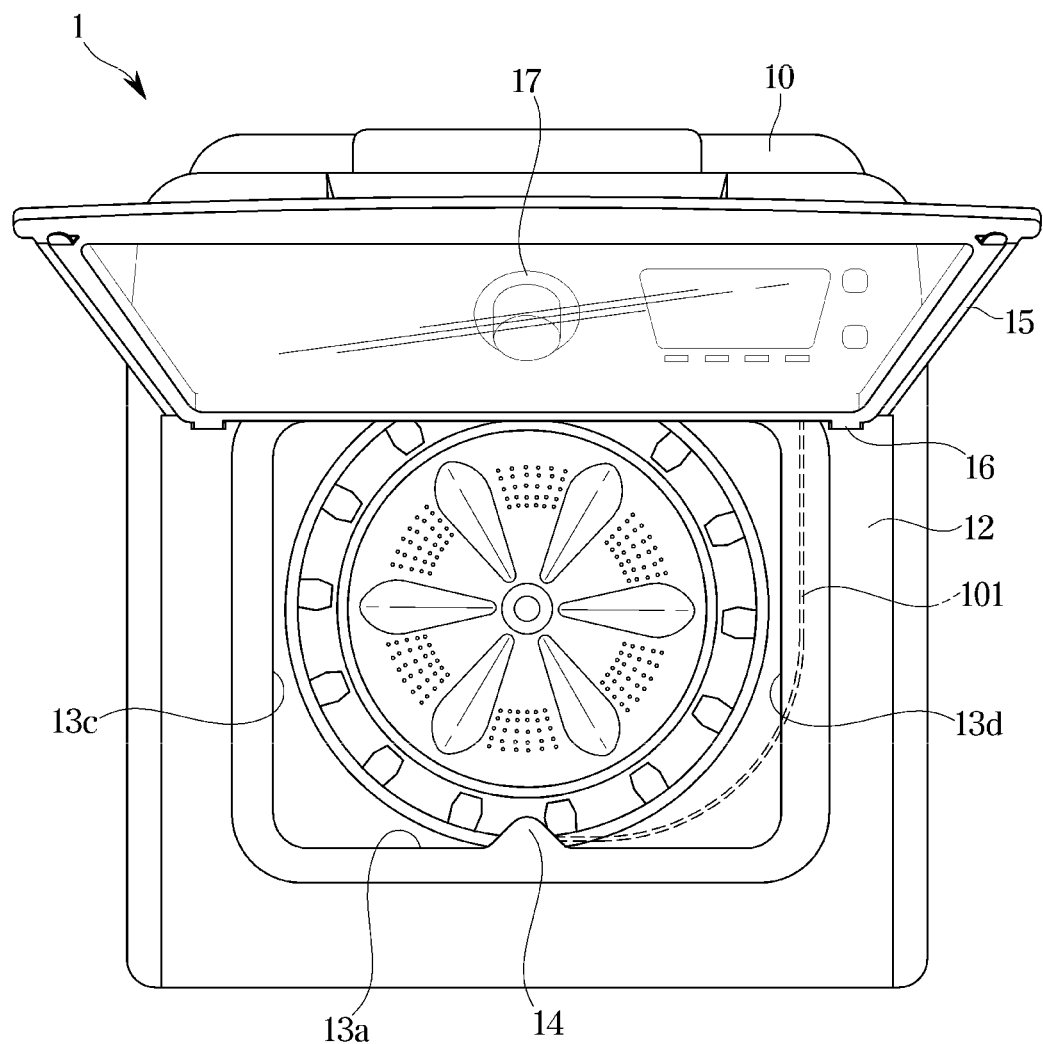
FIG. 1 illustrates an appearance of a washing machine according to an embodiment of the disclosure.
Figure 1:
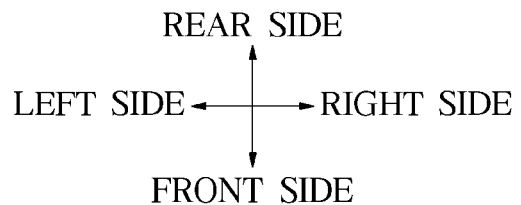

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

Reference will now be made in detail to the exemplary embodiments of the present disclosure, examples of which are illustrated in the accompanying drawings, wherein like reference numerals refer to like elements throughout.

The expression, "at least one of a, b, and c," should be understood as including only a, only b, only c, both a and b, both a and c, both b and c, or all of a, b, and c.

Therefore, it is an aspect of the disclosure to provide a washing machine capable of identifying whether laundry of an inner tub includes waterproof clothing, and a control method thereof.

It is another aspect of the disclosure to provide a washing machine including a camera configured to capture an image of an inside of an inner tub, and capable of identifying whether laundry of the inner tub includes waterproof clothing based on image data of the image of the inner tub captured by the camera, and a control method thereof.

It is another aspect of the disclosure to provide a washing machine capable of reducing a rotational speed of an inner tub during a spinning cycle when laundry of the inner tub includes waterproof clothing, and a control method thereof.

The disclosure will be described more fully hereinafter with reference to the accompanying drawings.

Figure 2:
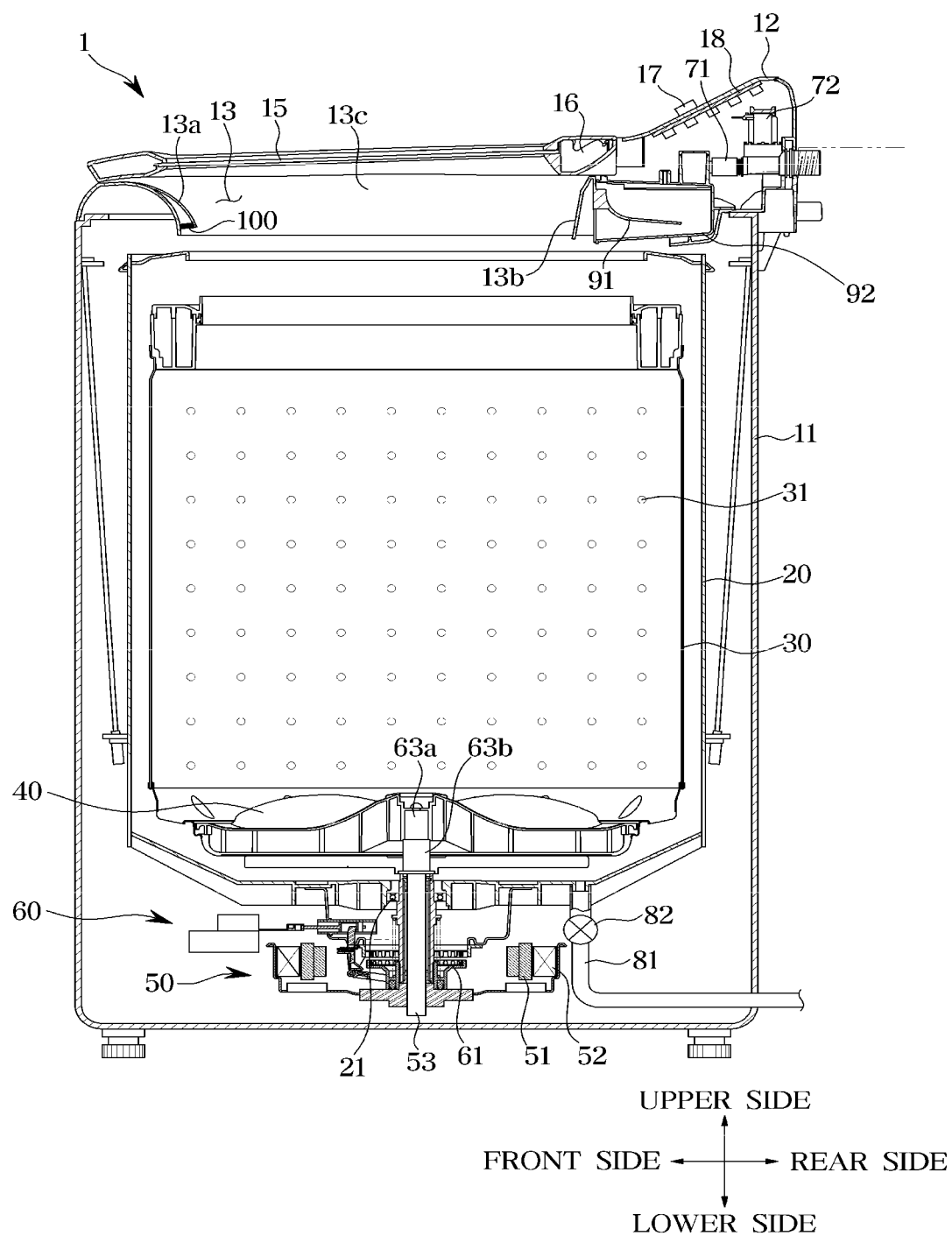
FIG. 2 illustrates a side cross-section of the washing machine, including a camera provided on a front inner wall of an inlet, according to an embodiment of the disclosure.
Figure 3:
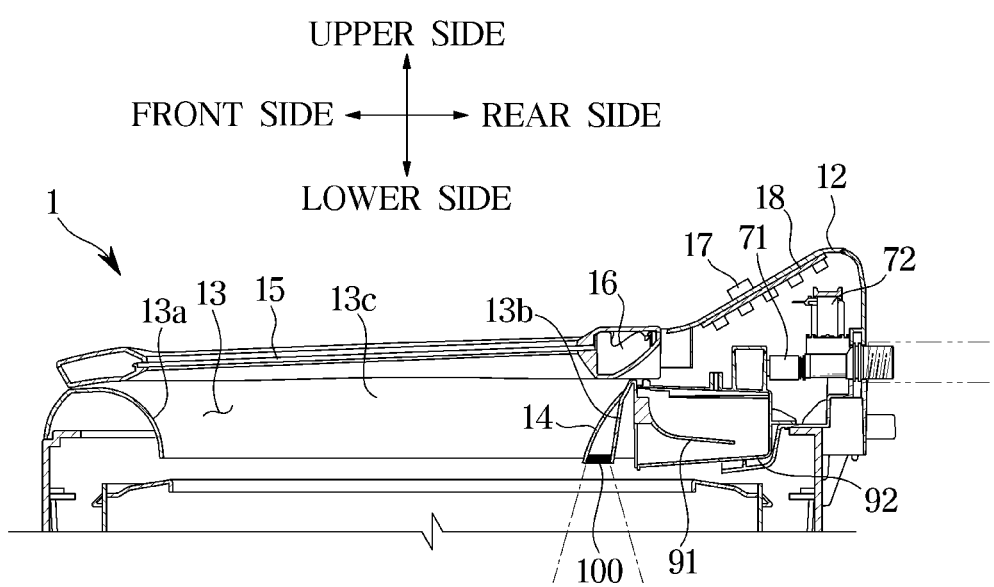
FIG. 3 illustrates a side cross-section of the washing machine, including the camera provided on a rear inner wall of the inlet, according to an embodiment of the disclosure.
Figure 4:
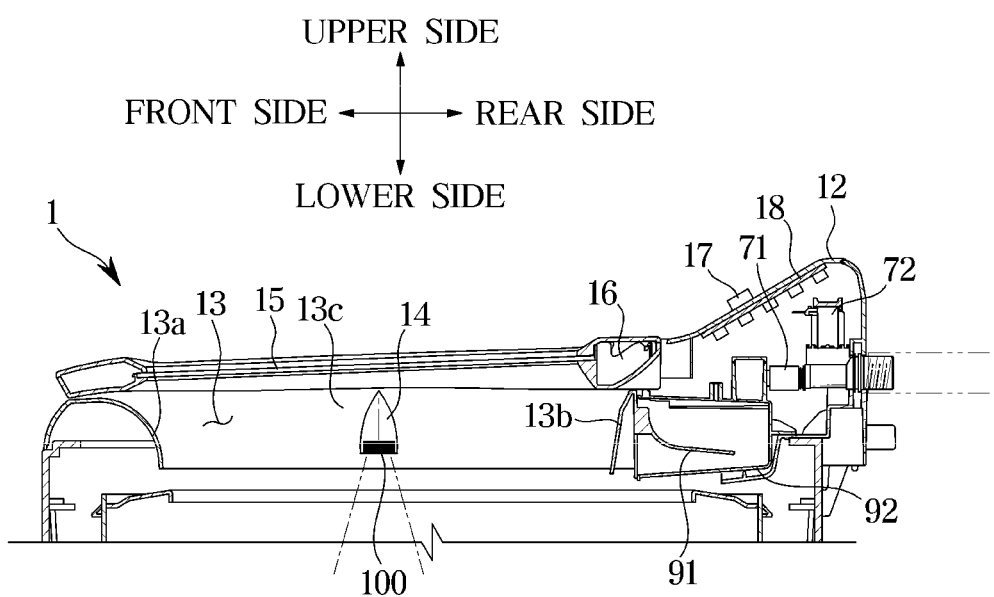
FIG. 4 illustrates a side cross-section of the washing machine, including the camera provided on a side inner wall of an inlet, according to an embodiment of the disclosure.
Figure 5:
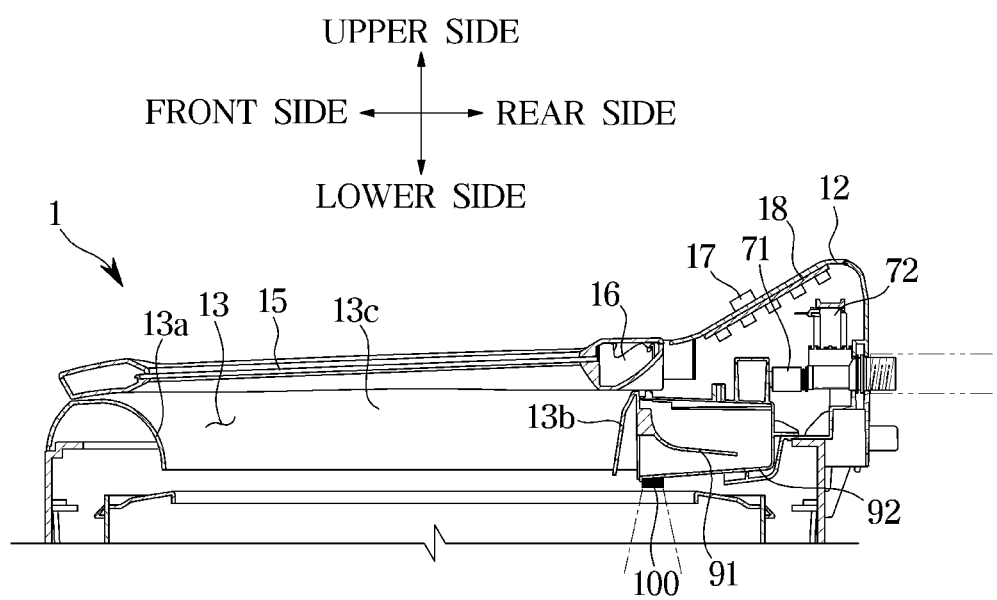
FIG. 5 illustrates a side cross-section of the washing machine, including the camera provided on a lower side of a dispenser housing, according to an embodiment of the disclosure.
Figure 6:
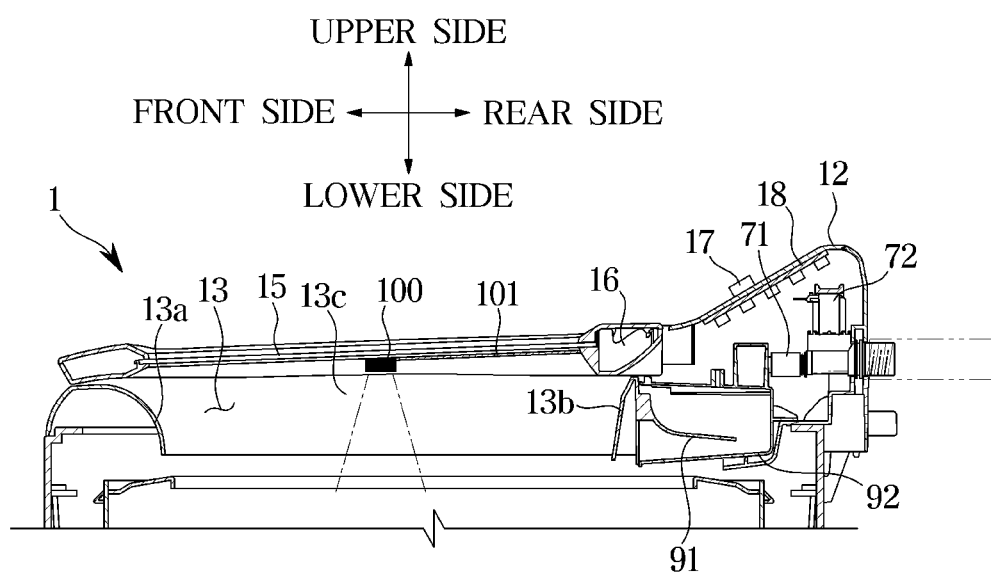
FIG. 6 illustrates a side cross-section of the washing machine, including the camera provided on a lower side of a door, according to an embodiment of the disclosure.

FIG. 1 illustrates an appearance of a washing machine according to an embodiment of the disclosure. FIG. 2 illustrates a side cross-section of the washing machine, including a camera provided on a front inner wall of an inlet, according to an embodiment of the disclosure. FIG. 3 illustrates a side cross-section of the washing machine, including the camera provided on a rear inner wall of the inlet, according to an embodiment of the disclosure. FIG. 4 illustrates a side cross-section of the washing machine, including the camera provided on a side inner wall of an inlet, according to an embodiment of the disclosure. FIG. 5 illustrates a side cross-section of the washing machine including the camera provided on a lower side of a dispenser housing, according to an embodiment of the disclosure. FIG. 6 illustrates a side cross-section of the washing machine including the camera provided on a lower side of a door, according to an embodiment of the disclosure.

Referring to FIGS. 1 to 6, a washing machine 1 includes a cabinet 10, an outer tub 20, an inner tub 30, a pulsator 40, a motor 50, a clutch 60, a water supply conduit 71, a water drain conduit 81, a detergent dispenser 91, and a camera 100.

The cabinet 10 may accommodate components contained in the washing machine 1. For example, the cabinet 10 may accommodate the outer tub 20, the inner tub 30, the pulsator 40, the motor 50, the clutch 60, the water supply conduit 71, the water drain conduit 81, the detergent dispenser 91 and a printed circuit board 18.

The cabinet 10 includes a cabinet body 11 forming a bottom and side walls of the washing machine 1, and a top cover 12 covering an open top of the cabinet body 11.

In a central portion of an upper surface of the cabinet 10, an inlet 13 for putting laundry and taking out laundry is provided. In other words, the inlet 13 may be provided in the central portion of the top cover 12.

The inlet 13 is provided with a door 15 configured to open and close the inlet 13. The door 15 is rotatably mounted to the top cover 12 by a hinge 16. For example, the hinge 16 is installed at the rear of the inlet 13 and the hinge 16 may be connected to the rear of the door 15.

On the upper surface of the cabinet 10, a control panel 17 including a user inputter configured to obtain a user input regarding the washing machine 1 from a user and a display, on which operation information of the washing machine 1 is displayed, is provided.

The user inputter and the display are installed on the printed circuit board 18 and exposed to the outside of the cabinet 10 so as to form the control panel 17. On the printed circuit board 18, not only the user inputter and the display are mounted, but a processor and a memory constituting a controller described below may be mounted.

The control panel 17 may be provided on a rear side of an upper surface of the top cover 12, as shown in FIG. 1, and the printed circuit board 18 may be provided on a lower rear side of the top cover 12 in accordance with the control panel 17. However, the positions of the control panel 17 and the printed circuit board 18 are not limited to those shown in FIG. 1. For example, the control panel 17 may be provided on an upper front surface of the top cover 12, and the printed circuit board 18 may be provided on a lower front side of the top cover 12.

The outer tub 20 is provided in the inside of the cabinet 10 and may receive water for washing and/or rinsing.

The outer tub 20 may have a cylindrical shape with an open top and a closed bottom, and the outer tub 20 may have a cylindrical shape in which a central axis thereof is approximately perpendicular to the bottom.

The open upper portion of the outer tub 20 corresponds to the inlet 13 of the top cover 12, and the laundry may be put into or taken out of the inner tub 30 through the inlet 13 of the top cover 12 and the open upper portion of the outer tub 20.

The closed lower portion of the outer tub 20 that is the bottom of the outer tub 20 is connected to the water drain conduit 81 extending to the outside of the washing machine 1.

A hole, through which a motor shaft 53 of the motor 50 passes, is provided in the central portion of the bottom surface of the outer tub 20, and a bearing 21 for rotatably fixing the motor shaft 53 of the motor 50 is provided on an inner wall of the hole.

The inner tub 30 may be rotatably provided in the inside of the outer tub 20 and may accommodate laundry.

The inner tub 30 may have a cylindrical shape with an open top and a closed bottom, and the inner tub 30 may have a cylindrical shape in which a central axis thereof is approximately perpendicular to the bottom. In addition, the inner tub 30 may be rotated about a rotation axis that is approximately similar to the central axis of the cylinder.

A through hole 31 configured to connect an inside of the inner tub 30 to an outside of the inner tub 30 (that is an inside of the outer tub) is formed on the side wall of the inner tub 30.

The open upper portion of the inner tub 30 corresponds to the inlet 13 of the top cover 12, and laundry is put into or taken out of the inner tub 30 through the inlet of the top cover 12 and the open upper portion of the inner tub 30.

The bottom surface of the inner tub 30 may be connected to an outer shaft 63b of the motor 50 configured to rotate the inner tub 30, and thus the bottom surface may be rotated by the rotation of the motor 50 that is transmitted through the outer shaft 63b. A hole, through the inner shaft 63a of the motor 50 connected to the pulsator 40 passes, is provided on the bottom surface of the inner tub 30.

The pulsator 40 is rotatably provided on an inside of the bottom surface of the inner tub 30.

The pulsator 40 may be rotated independently of the inner tub 30. In other words, the pulsator 40 may be rotated in a direction the same as or different from the inner tub 30. Further, the pulsator 40 may be rotated at a rotational speed the same as or different from the inner tub 30.

The pulsator 40 may be connected to the inner shaft 63a of the motor 50 passing through the outer tub 20 and the inner tub 30, and may be rotated by the rotation of the motor 50 transmitted through the inner shaft 63a.

The pulsator 40 may be rotated to generate water current in the inside of the inner tub 30 during the washing or rinsing. Friction between water and laundry is generated by the water current, and laundry may be washed by friction between water and laundry.

The motor 50 and the clutch 60 may be provided on the outside (below) of the bottom surface of the outer tub 20.

The clutch 60 includes a clutch housing fixed to the bottom surface of the outer tub 20 and a reduction gear 61 configured to decelerate rotation and transmit the decelerated rotation.

The motor 50 includes a stator 51 fixed to the clutch housing and a rotor 52 configured to be rotatable. For example, the motor 50 may include a brushless direct current motor (BLDC motor) or a permanent magnet synchronous motor (PMSM) that is easy to control the rotational speed.

The rotor 52 is rotated by magnetic interaction with the stator 51, and connected to the motor shaft 53. The motor shaft 53 may be selectively connected to the outer shaft 63b and the inner shaft 63a of the clutch 60. The outer shaft 63b and the inner shaft 63a may rotatably penetrate the outer tub 20 by the bearing 21 of the outer tub 20. The outer shaft 63b may be coupled to the inner tub 30 and the inner shaft 63a may be coupled to the pulsator 40.

The clutch 60 may transmit the rotation of the motor shaft 53 to the outer shaft 63b and the inner shaft 63a without a change, or the clutch 60 may decelerate the rotation of the motor shaft 53 and then transmit the decelerated rotation to the inner shaft 63a. The reduction gear 61 of the clutch 60 may decelerate the rotation of the motor shaft 53 and then transmit the decelerated rotation to the inner shaft 63a.

For example, during the washing or rinsing, the clutch 60 may connect the motor shaft 53 to the inner shaft 63a, and decelerate the rotation of the motor shaft 53 through the reduction gear 61 and then transmit the decelerated rotation to the inner shaft 63a. Accordingly, during the washing or rinsing, the pulsator 40 may be rotated at a low speed while the inner tub 30 is not driven.

In addition, during the spinning, the clutch 60 may connect the motor shaft 53 to both the outer shaft 63b and the inner shaft 63a, and transmit the rotation of the motor shaft 53 to the outer shaft 63b and the inner shaft 63a without a change. Accordingly, during the spinning, the inner tub 30 and the pulsator 40 may be rotated at a high speed.

The water supply conduit 71 may be provided above the outer tub 20 and may supply water to the outer tub 20 and the inner tub 30 from an external water supply source. A water supply valve 72 is provided on the water supply conduit 71.

The water supply conduit 71 may extend from an external water supply source to the detergent dispenser 91 and guide water to the outer tub 20 through the detergent dispenser 91.

The water supply valve 72 may allow or block supply of water from the external water supply source to the outer tub 20 in response to an electrical signal. For example, the water supply valve 72 may employ a solenoid valve opened and closed in response to an electrical signal.

The water drain conduit 81 may be provided below the outer tub 20, and discharge water accommodated in the outer tub 20 and the inner tub 30 to the outside. A water drain valve 82 is provided on the water drain conduit 81.

The water drain valve 82 may allow or block the discharge of water from the outer tub 20 in response to an electrical signal. For example, the water drain valve 82 may employ a solenoid valve opened and closed in response to an electrical signal.

The detergent dispenser 91 may be provided above the outer tub 20, and store detergent and supply the detergent to the outer tub 20 and the inner tub 30 together with water. The dispenser housing 92 may accommodate the detergent dispenser 91, and the detergent dispenser 91 may be taken out of the dispenser housing 92.

The detergent dispenser 91 may be connected to the water supply conduit 71, and water supplied through the water supply conduit 71 may be mixed with the detergent of the detergent dispenser 91. A mixture of detergent and water may be supplied to the outer tub 20 from the detergent dispenser 91.

The camera 100 may capture an image the inside of the inner tub 30 and generate image data corresponding to the captured image (hereinafter referred to as an "image of inner tub") of the inside of the inner tub 30.

The camera 100 may be provided on inner walls 13a, 13b, 13c, and 13d of the inlet 13 of the top cover 12. As illustrated in FIGS. 1 and 2, the inner walls 13a, 13b, 13c, and 13d may be formed in the inlet 13 of the top cover 12, and the inner walls 13a, 13b, 13c, and 13d of the inlet 13 include a front inner wall 13a, a rear inner wall 13b, a left inner wall 13c, and a right inner wall 13d.

For example, the camera 100 may be provided on the front inner wall 13a of the inlet 13. A protrusion 14 protruding from the front inner wall 13a to the center of the inlet 13 may be formed on the front inner wall 13a of the inlet 13 and the camera 100 may be installed in a lower portion of the protrusion 14.

The camera 100 may have a field of view towards the inside of the inner tub 30 because the camera 100 is installed in the lower portion of the protrusion 14 protruding from the front inner wall 13a to the center of the inlet 13. Therefore, the camera 100 may capture an image of the inside of the inner tub 30 and output image data corresponding to the captured image of the inner tub 30.

The protrusion 14 may be integrally formed with the front inner wall 13a of the inlet 13, and thus it is possible to prevent the camera 100 from being wet by water during the washing, rinsing or spinning.

The camera 100 may include a lens and an image sensor, and the image sensor may employ a complementary metal oxide semiconductor (CMOS) image sensor or a charge coupled device (CCD) image sensor.

The camera 100 is electrically connected to the printed circuit board 18 through an electric wire 101. The camera 100 may receive power from the printed circuit board 18 through the electric wire 101. In addition, the camera 100 may receive a control signal from the printed circuit board 18 through the electric wire 101 and transmit image data of the captured image of inner tub 30 to the printed circuit board 18 through the electric wire 101.

The electric wire 101 may extend from the camera 100 to the printed circuit board 18. For example, when the printed circuit board 18 is provided on the lower rear side of the top cover 12, the electric wire 101 may be bypassed around the inlet 13 along the lower portion of the top cover 12 so as not to be seen by a user, and then extend from the camera 100 to the printed circuit board 18. Alternatively, when the printed circuit board 18 is provided on the lower front side of the top cover 12, the electric wire 101 may extend from the camera 100, which is installed on the front inner wall 13a of the inlet 13 of the top cover 12, to the printed circuit board 18 that is installed in the lower front side of the top cover 12.

However, the position of the camera 100 is not limited to that shown in FIGS. 1 and 2.

For example, the camera 100 may be provided on the rear inner wall 13b of the inlet 13 of the top cover 12 as shown in FIG. 3. A protrusion 14 protruding forward from the rear inner wall 13b may be formed on the rear inner wall 13b of the inlet 13 and the camera 100 may be installed in a lower portion of the protrusion 14.

The camera 100 installed in the lower portion of the protrusion 14 may have a field of view toward the inside of the inner tub 30 and the camera 100 may capture an image of the inside of the inner tub 30.

The camera 100 is electrically connected to the printed circuit board 18 through an electric wire 101. For example, when the printed circuit board 18 is provided on the lower rear side of the top cover 12, the electric wire 101 may extend from the camera 100, which is installed on the rear inner wall 13b of the inlet 13 of the top cover 12, to the printed circuit board 18 that is installed in the lower rear side of the top cover 12.

Alternatively, the camera 100 may be provided on the left inner wall 13c or the right inner wall 13d of the inlet 13 of the top cover 12 as shown in FIG. 4. A protrusion 14 protruding forward from the rear inner wall 13b may be formed on the left inner wall 13c or the right inner wall 13d of the inlet 13, and the camera 100 may be installed in a lower portion of the protrusion 14.

The camera 100 installed in the lower portion of the protrusion 14 may have a field of view toward the inside of the inner tub 30, and the camera 100 may be electrically connected to the printed circuit board 18 through the electric wire 101.

However, when the camera 100 is provided on the inner walls 13a, 13b, 13c, and 13d of the inlet, the installation position of the camera 100 is not limited to those shown in FIGS. 1, 2, 3, and 4, and thus the camera 100 may be installed at any position capable of having a field of view toward the inside of the inner tub 30 from the inner walls 13a, 13b, 13c, and 13d of the inlet 13.

Alternatively, the camera 100 may be provided in a lower side of the dispenser housing 92 as illustrated in FIG. 5. The dispenser housing 92 may accommodate the detergent dispenser 91 containing detergent and may be provided in the lower portion of the rear inner wall 13b of the inlet 13.

The camera 100 provided in the lower side of the dispenser housing 92 may have a field of view toward the inside of the inner tub 30, and may be electrically connected to the printed circuit board 18 through the electric wire 101.

Alternatively, the camera 100 may be provided in a lower side of the door 15 as shown in FIG. 6.

When the door 15 is closed, the camera 100 provided in the lower side of the door 15 may have a field of view toward the inside of the inner tub 30 and may capture an image of the inside of the inner tub 30.

When the door 15 is opened, the field of view of the camera 100 provided in the lower side of the door 15 may be directed to the front of the washing machine 1. In order to protect the privacy of the user, when the door 15 is opened, power may not be supplied to the camera 100. Alternatively, when the door 15 is opened, the camera 100 may be prevented from capturing an image.

The camera 100 may be electrically connected to the printed circuit board 18 through the electric wire 101.

The electric wire 101 may extend to the printed circuit board 18 along the lower portion of the door 15. For example, the electric wire 101 may directly extend from the lower portion of the door 15 to the lower portion of the top cover 12. However, because the door 15 is rotatably installed on the top cover 12, the electric wire 101 may be disconnected upon the opening and closing of the door 5.

To prevent this, the electric wire 101 may extend from the lower portion of the door 15 to the lower portion of the top cover 12 through the hinge 16. For example, a hole may be formed in a center of a portion, in which the hinge 16 is rotated upon the opening and closing of the door 5, and then the electric wire 101 may be inserted into the hole to pass through the hole of the hinge 16.

In addition, a first electrode connected to the camera 100 may be provided at a portion in which the door 15 is in contact with the top cover 12, and a second electrode connected to the printed circuit board 18 may be provided at a portion in which the top cover 12 is in contact with the door 15. By the contact of the first electrode and the second electrode, the camera 100 may be electrically connected to the printed circuit board 18.

As mentioned above, the camera 100 may be installed at various positions capable of having a field of view toward the inside of the inner tub 30, and the position is not limited to this detailed description and accompanying drawings.

Hereinafter a control configuration and a control operation of the washing machine 1 for washing, rinsing, and spinning laundry will be described.

Figure 7:
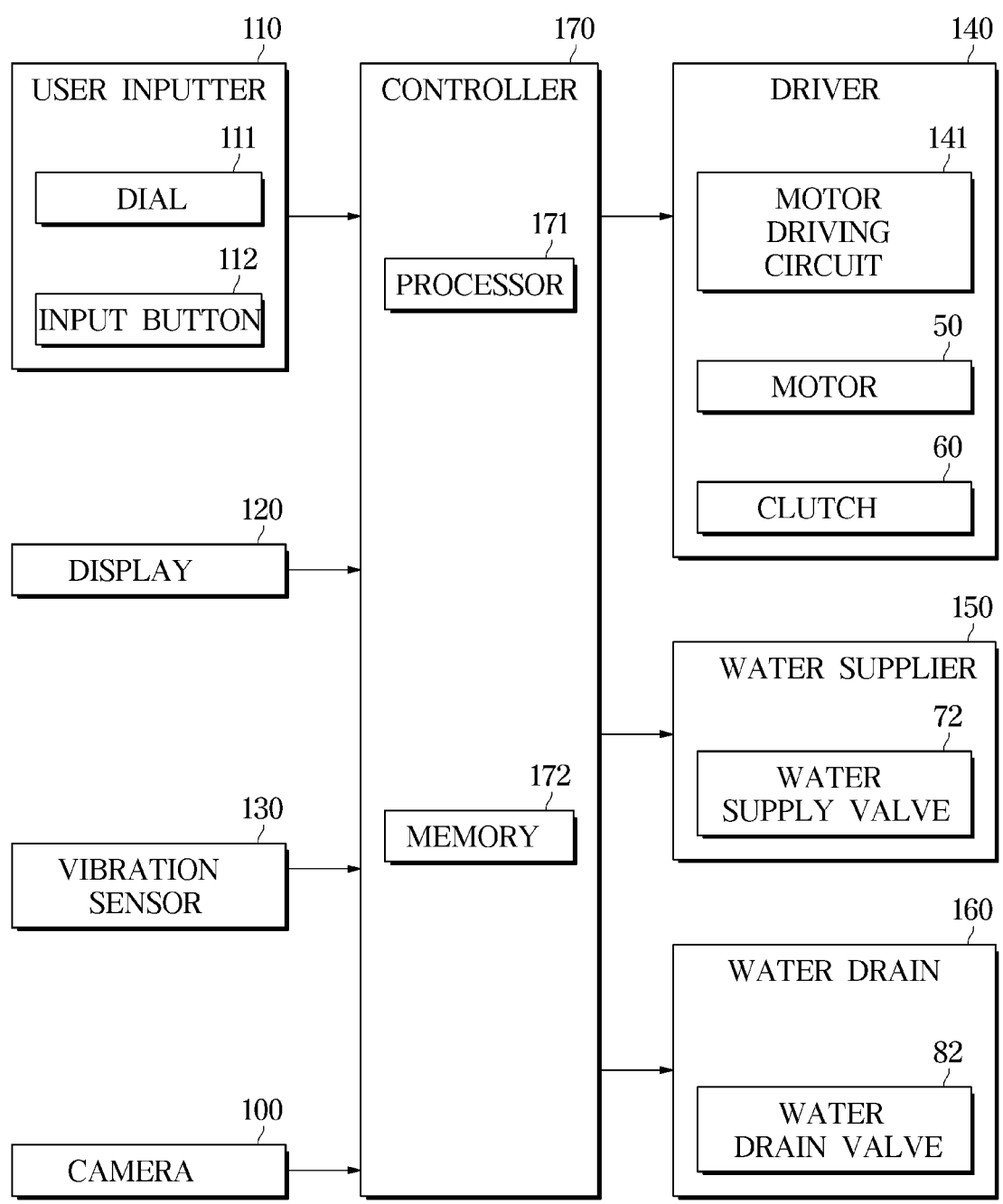
FIG. 7 illustrates a control configuration of the washing machine according to an embodiment of the disclosure.
Figure 8:
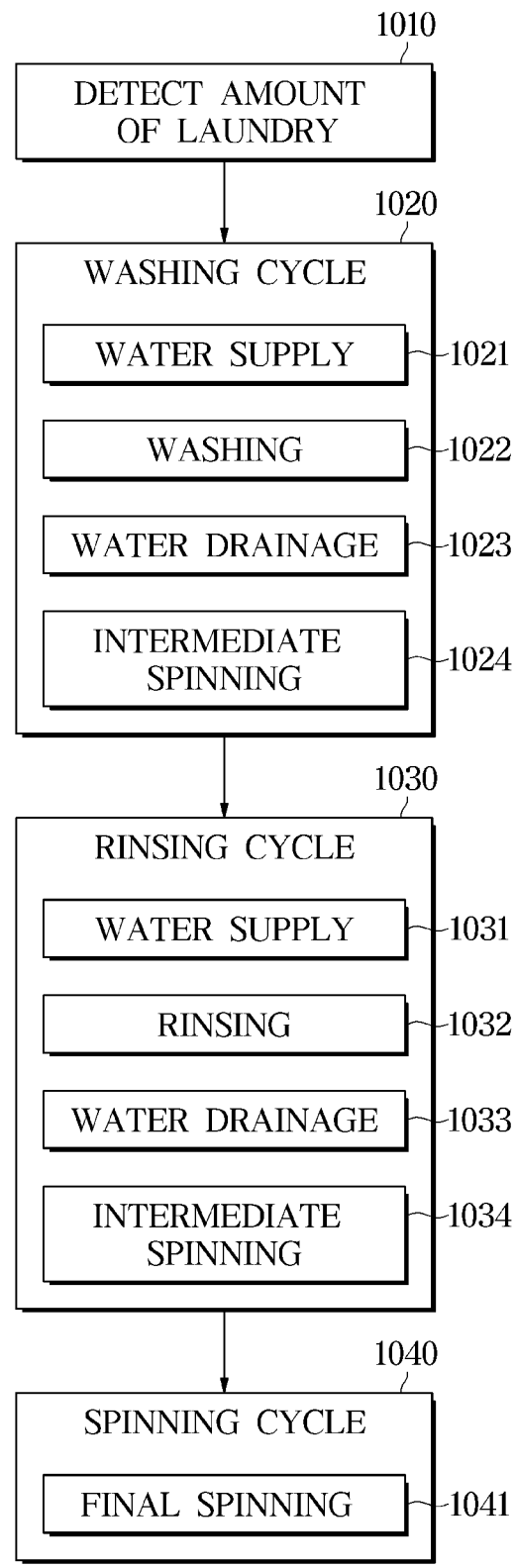
FIG. 8 illustrates a control operation of the washing machine according to an embodiment of the disclosure.

FIG. 7 illustrates a control configuration of the washing machine according to an embodiment of the disclosure. FIG. 8 illustrates a control operation of the washing machine according to an embodiment of the disclosure.

Referring to FIGS. 7 and 8, the washing machine 1 includes the user inputter 110, the display 120, a vibration sensor 130, the camera 100, a driver 140, a water supplier 150, a water drain 160, and a controller 170. In addition, the washing machine 1 may perform detecting an amount of laundry (1010), a washing cycle (1020), a rinsing cycle (1030), and a spinning cycle (1040).

The driver 140 includes a motor driving circuit 141, the motor 50, and the clutch 60. The water supplier 150 includes the water supply valve 72, and the water drain 160 includes the water drain valve 82.

The motor 50, the water supply valve 72, and the water supply valve 72 may be the same as described with reference to FIG. 2, and a description thereof will be omitted.

The user inputter 110 is provided on the control panel 17 of the top cover 12, and the user inputter 110 includes a dial 111 configured to obtain a user input by a rotational movement and an input button 112 configured to obtain a user input by a vertical movement.

A user can select any one of a plurality of washing courses by rotating the dial 111. The washing machine 1 may include a plurality of different washing courses for washing different kinds of laundry. Different washing courses may include different washing time, different number of rinsing times, and different spinning time.

The input button 112 may include a washing button configured to adjust a period of washing time in which the washing machine 1 washes laundry, a rinsing button configured to adjust the number of rinsing times in which the washing machine 1 rinses laundry, and a spinning button configured to adjust a period of spinning time in which the washing machine 1 spines laundry. Further, the input button 112 may include a power button configured to allow or block power supplied from an external power source and an operation button configured to start or stop the operation of the washing machine 1.

In response to a user input received from a user, the dial 111 and the input button 112 may transmit an electrical signal (voltage or current) corresponding to the user input to the controller 170.

The display 120 may be installed on the control panel 17 of the top cover 12, and display an operation state of the washing machine 1 and a user's control command. For example, the display 120 may display a washing course selected by a user, and during the operation, the washing machine 1 may display a time remaining until the completion of the operation.

The display 120 may include a light emitting diode (LED) panel, an organic light emitting diode (OLED) panel, or a liquid crystal display (LCD) panel.

The display 172 may employ a touch screen panel (TSP) configured to receive a control command from a user and display operation information corresponding to the received control command.

As mentioned above, the display 120 may receive a display control signal from the controller 170 and display an image corresponding to the display control signal.

The vibration sensor 130 may be provided on the outside of the outer tub 20, detect a vibration of the outer tub 20, and provide information regarding the vibration of the outer tub 20 to the controller 170.

The vibration sensor 130 may include an acceleration sensor configured to detect acceleration caused by the vibration of the outer tub 20. The acceleration sensor may measure x-axis acceleration, y-axis acceleration, and/or z-axis acceleration caused by the vibration of the outer tub 20, and output data indicating the x-axis acceleration, the y-axis acceleration, and/or the z-axis acceleration.

The vibration sensor 130 may transmit the acceleration data output from the acceleration sensor to the controller 170 without a change. Alternatively, the vibration sensor 130 may calculate amplitudes caused by the vibration of the outer tub 20 based on the acceleration data and provide information on the amplitude of the outer tub 20 to the controller 170. The controller 170 may calculate the amplitude of the outer tub 20 based on the acceleration data received from the vibration sensor 130 or obtain the amplitude of the outer tub 20 from the vibration sensor 130.

The motor driving circuit 141 may be provided in the vicinity of the motor 50.

The motor driving circuit 141 may supply a driving current to the motor 50. The motor driving circuit 141 may convert AC power of an external power source into driving power (DC power or AC power) for driving the motor 50.

The motor driving circuit 141 may have various topologies according to the type of the motor 50.

For example, when the motor 50 is a DC motor, the motor driving circuit 141 may convert AC power (AC voltage and AC current) supplied from an external power source into DC power (DC voltage and DC current), and supply intermittently the DC power to the motor 50 (that is, the motor driving circuit 141 applies the DC voltage and supplies the DC power to the motor).

When the motor 50 is a BLDC, the motor driving circuit 141 may convert AC power into DC power, and then convert DC power back into square wave AC power. Thereafter, the motor driving circuit 141 may supply the square wave AC power to the motor 50.

When the motor 50 is a PMSM, the motor driving circuit 141 may convert AC power into DC power, and then convert DC power into sine wave AC power. Thereafter, the motor driving circuit 141 may supply the sine wave AC power to the motor 50.

When the motor 50 is an induction motor, the motor driving circuit 141 may intermittently supply AC power, which is supplied from an external power source, to the motor 50.

In addition, in order to prevent damage to the motor 50 caused by overload, the motor driving circuit 141 may detect a first driving current supplied to the motor 50, and information (for example, driving current value) on the first driving current to the controller 170.

The camera 100 may capture an image of the inside of the inner tub 30 and provide image data corresponding to the captured image of inner tub 30 to the controller 170. For example, when laundry is placed in the inner tub 30, the camera 100 may capture an image of the laundry accommodated in the inside of the inner tub 30 and provide image data corresponding to an image including the laundry to the controller.

As described above, the camera 100 may be provided on the inner walls 13a, 13b, 13c, and 13d of the inlet 13 or provided on the lower portion of the door 15, and the camera 100 may have a field of view toward the inside of the inner tub 30.

The controller 170 may be mounted on the printed circuit board 18 provided on a rear surface of the control panel 17.

The controller 170 is electrically connected to the user inputter 110, the display 120, the vibration sensor 130, the motor driving circuit 141, the camera 100, the water supply valve 72, and the water drain valve 82.

Based on the signal, information or data output from the user inputter 110, the vibration sensor 130 and the camera 100, the controller 170 may control the display 120, the motor 50, the water supply valve 72 and the water drain valve 82.

The controller 170 includes a processor 171 configured to generate a control signal for controlling the operation of the washing machine 1, and a memory 172 configured to memorize or store programs and data for generating a control signal for controlling the operation of the washing machine 1. The processor 171 and the memory 172 may be implemented as separate chips or may be implemented as a single chip. Further, the controller 170 may include a plurality of processors or a plurality of memories.

The processor 171 may process data and/or signals according to a program provided from the memory 172, and provide control signals to each component of the washing machine 1 based on the processing result.

The processor 171 may receive an electrical signal regarding a user input from the user inputter 110 and receive data regarding the vibration of the outer tub 20 from the vibration sensor 130. Further, the processor 171 may receive image data corresponding to the internal image of the inner tub 30 from the camera 100.

The processor 171 may process electrical signals related to the user input, data related to the temperature of the outer tub 20, and image data related to the internal image of the inner tub 30.

The processor 171 may provide a motor control signal to the motor driving circuit 141, a water supply signal to the water supply valve 72, and a drain signal to the water drain valve 82 based on the processing of the user input. For example, the processor 171 may identify a washing course selected by the user based on the processing of the user input, and select a rotational speed and an operation cycle of the inner tub 30 (for example, on time and off time) according to the washing course selected by the user, and provide a motor signal, which is for rotating the motor 50 according to the selected rotational speed and operation cycle, to the motor driving circuit 141.

The processor 171 may provide a motor control signal to the motor driving circuit 141, a water supply signal to the water supply valve 72, and a water drain signal to the water drain valve 82 based on the processing of image data of the internal image of the inner tub 30. For example, the processor 171 may identify an arrangement of the laundry accommodated in the inner tub 30 by processing image data of the internal image of the inner tub 30, and provide a motor signal, which is for controlling the rotational speed of the inner tub 30 based on the arrangement of the laundry, to the motor driving circuit 141.

The processor 171 may include an arithmetic circuit, a memory circuit, and a control circuit. The processor 171 may include one chip or a plurality of chips. Further, the processor 171 may include one core processor or may include a plurality of core processors.

The memory 172 may memorize or store programs and data for controlling the operation of the washing machine 1 according to the washing course. For example, the memory 172 may memorize or store the rotational speed of the inner tub 30 according to the washing course, and the washing time, the number of rinsing times, and the spinning time according to the washing course.

The memory 172 may memorize a user input received through the dial 111 and the input button 112, or information on the operation of the washing machine 1 (for example, a cycle that is currently performed, and a time remaining until the operation of the washing machine is completed).

The memory 172 may include volatile memory such as static random access memory (S-RAM), and dynamic random access memory (D-RAM), and non-volatile memory such as read-only memory (ROM) and erasable programmable read only memory (EPROM).

The memory 172 may include one memory element or a plurality of memory elements.

The processor 171 may generate a control signal for controlling the washing machine 1 to perform the operations described below, and the memory 172 may store instructions for the processor 171 to generate a control signal.

As illustrated in FIG. 8, the controller 170 may control each configuration of the washing machine 1 to wash, rinse, spin, and dry the laundry. The controller 170 may measure the amount of laundry (1010), and perform the washing cycle (1020), the rinsing cycle (1030), and the spinning cycle (1040) in order.

The controller 170 measures the amount of laundry (1010).

According to increase or decrease in the amount of laundry, the inertia of the inner tub 30 increases. In addition, a greater torque and a greater driving current are required to accelerate the rotation of the inner tub 30.

The controller 170 may supply a predetermined amount of current to the motor 50 to rotate the inner tub 30 in the forward or reverse direction to measure the amount of laundry, thereby detecting the rotational speed of the inner tub 30 by the supplied current. The controller 170 may identify the amount of laundry based on the measured rotational speed of the inner tub 30.

The controller 170 performs the washing cycle (1020).

The controller 170 may supply water and detergent to the outer tub 20 (1021). The controller 170 may open the water supply valve 72 to supply water to the outer tub 20 based on the measured amount of laundry. By opening the water supply valve 72, water may be supplied to the outer tub 20 via the detergent dispenser 91. In addition, the detergent may be supplied to the outer tub 20 together with water during a first water supply for washing.

The controller 170 may rotate the pulsator 40 at a low speed for washing (1022). The controller 170 may control the clutch 60 to allow the rotation of the motor 50 to be transmitted to the pulsator 40, and control the motor 50 to rotate the pulsator 40 at a low speed (for example, a rotational speed of from approximately 45 rpm to 60 rpm). The controller 170 may control the motor 50 to alternately rotate the pulsator 40 in a first direction and a second direction. During the pulsator 40 alternates in the first direction and the second direction, the laundry in the inner tub 30 may be washed by friction with water.

After washing, the controller 170 discharges water from the outer tub 20 (1023). The controller 170 may open the water drain valve 82 to allow the water of the outer tub 20 to be discharged. The water of the outer tub 20 may be discharged to the outside by opening the water drain valve 82.

The controller 170 may rotate the inner tub 30 and the pulsator 40 at a high speed for intermediate spinning (1024). The controller 170 may control the motor 50 to rotate the inner tub 30 and the pulsator 40 at a high speed (for example, a rotational speed of from approximately 900 rpm to 1000 rpm). During the inner tub 30 and the pulsator 40 are rotated at a high speed, the laundry in the inner tub 30 may be located along the inner wall of the inner tub 30, and water absorbed by the laundry may be separated from the laundry by centrifugal force. Water separated from the laundry may pass through the through hole 31 of the inner tub 30 and then discharged to the outside through the outer tub 20 and the water drain conduit 81.

Thereafter, the controller 170 performs the rinsing cycle (1030). The controller 170 may supply water to the outer tub 20 (1031) and rotate the pulsator 40 at a low speed for rinsing (1032). During the pulsator 40 alternates in the first direction and the second direction, the laundry in the inner tub 30 may be rinsed by friction with water. The controller 170 may discharge the water of the outer tub 20 (1033), and may rotate the inner tub 30 and the pulsator 40 at a high speed for intermediate spinning (1034).

The controller 170 may perform the rinsing cycle a plurality of times. In addition, the controller 170 may omit the intermediate spinning in the last rinsing cycle.

Thereafter, the controller 170 performs the spinning cycle (1040). The controller 170 may rotate the inner tub 30 and the pulsator 40 at a high speed (1041).

As mentioned above, the controller 170 may perform the washing cycle (1020), the rinsing cycle (1030) and the spinning cycle (1040) in order to wash the laundry.

The washing machine 1 may perform one or more spinning, in which the inner tub 30 and the pulsator 40 are rotated at a high speed, during the washing cycle (1020), the rinsing cycle (1030) and the spinning cycle (1040).

The center of gravity of the laundry and the inner tub 30 deviates from the rotation axis of the inner tub 30 (when unbalance of weight occurs) because the inner tub 30 and the pulsator 40 are rotated at a high speed. Therefore, the outer tub 20 together with the inner tub 30 may be vibrated greatly. In some cases, the washing machine 1 may be damaged due to the vibration of the outer tub 20.

It is generally known that the unbalance of the inner tub 30 is caused by the laundry accommodated in the inner tub 30, and the unbalance of the inner tub 30 is caused by tangled laundry.

Particularly, clothes or bedding formed of a waterproof material, which does not transmit water or through which water does not pass, in the laundry may significantly cause unbalance of the inner tub 30. For example, the waterproof clothing or bedding may collect water as if it is a water bag, and the waterproof clothing or bedding may cause the unbalance in the weight in the inner tub 30 during the inner tub 30 is rotated at a high speed.

In order to prevent unbalance caused by such clothing or bedding formed of a waterproof material (hereinafter referred to as "waterproof laundry"), the washing machine 1 may identify the waterproof laundry contained in the laundry based on the image of the inner tub 30 captured by the camera 100, and reduce the rotational speed of the inner tub 30 for spinning, in response to the detection of the waterproof laundry.

As for the washing machine 1, a method for identifying the waterproof laundry contained in the laundry is not limited to including the camera 100. Alternatively, the washing machine 1 may include various configurations for identifying waterproof laundry. For example, the washing machine 1 may include an infrared sensor configured to emit infrared rays and receive infrared rays reflected by an object, an ultrasonic sensor configured to emit ultrasonic waves and receive ultrasonic waves reflected by an object, or a radar sensor configured to emit radio waves and receive radio waves reflected by an object.

Hereinafter the operation of the washing machine 1 for preventing unbalance due to waterproof laundry will be described.

Figure 9:
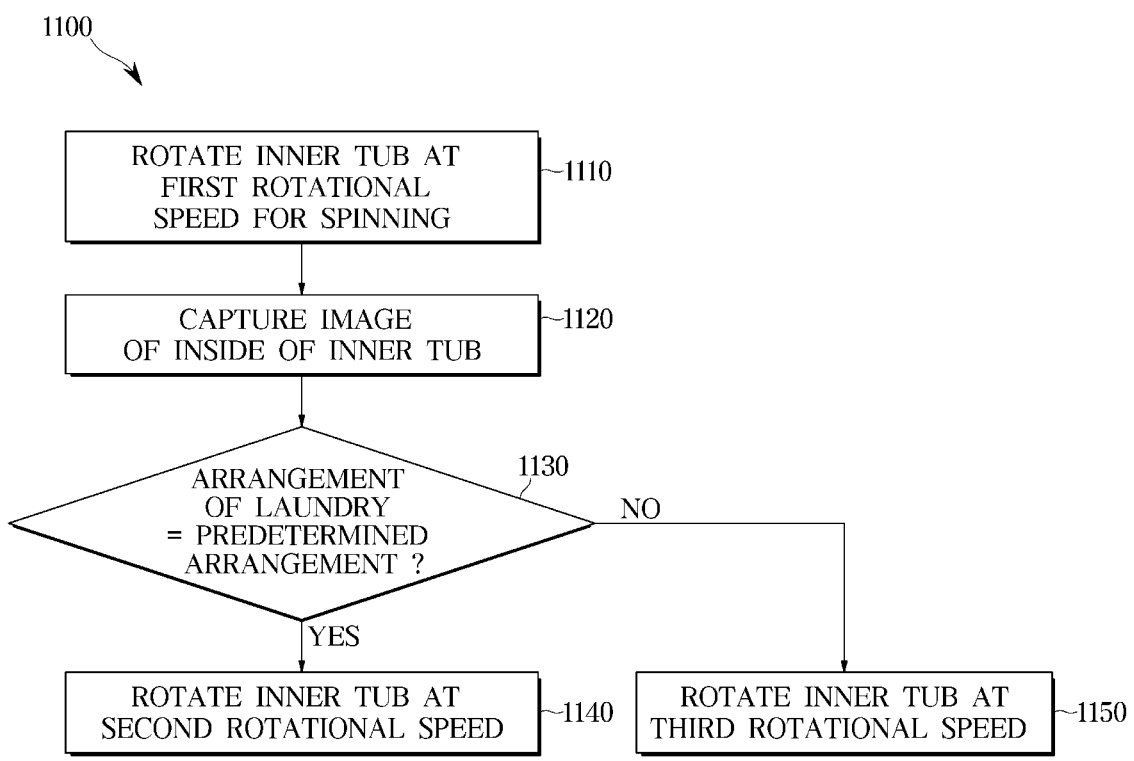
FIG. 9 illustrates a spinning operation of the washing machine according to an embodiment of the disclosure.
Figure 10:
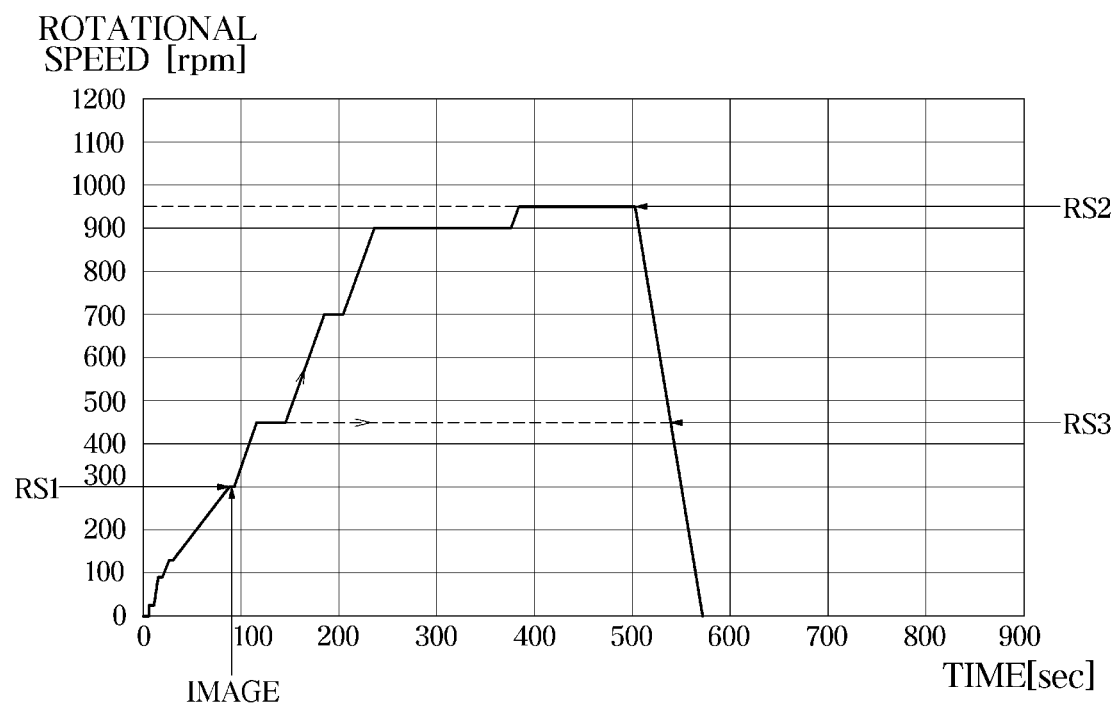
FIG. 10 illustrates an example of a rotational speed of an inner tub during the spinning operation of the washing machine according to an embodiment of the disclosure.
Figure 11:
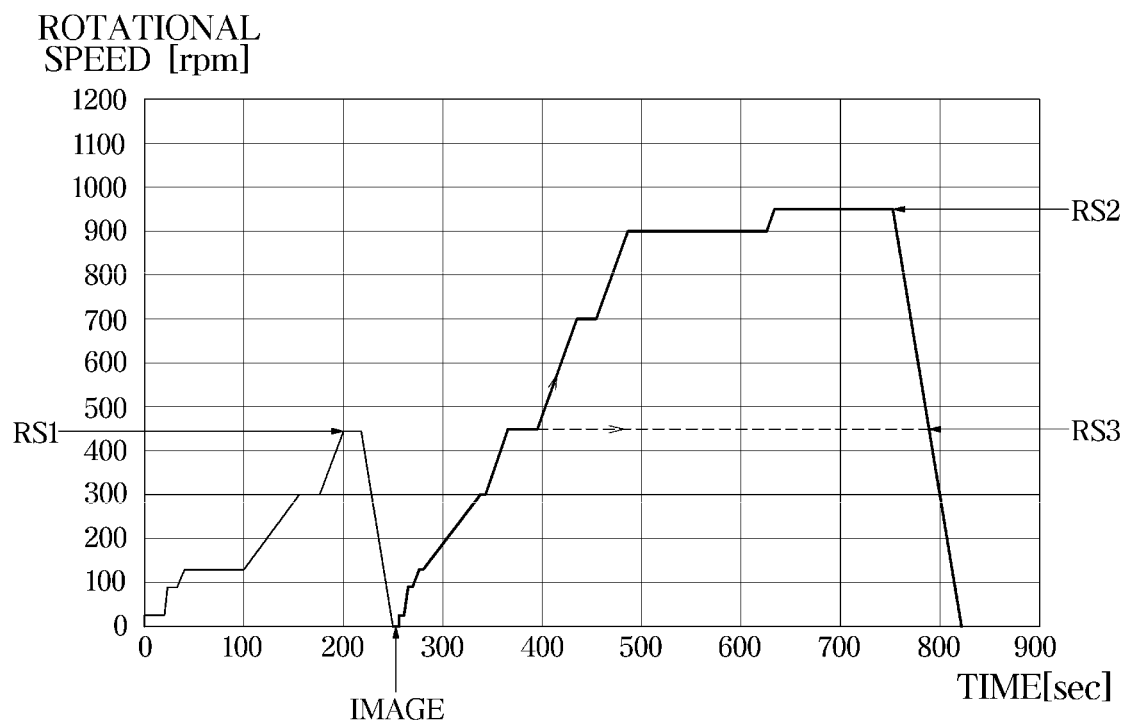
FIG. 11 illustrates another example of a rotational speed of the inner tub during the spinning operation of the washing machine according to an embodiment of the disclosure.
Figure 12:
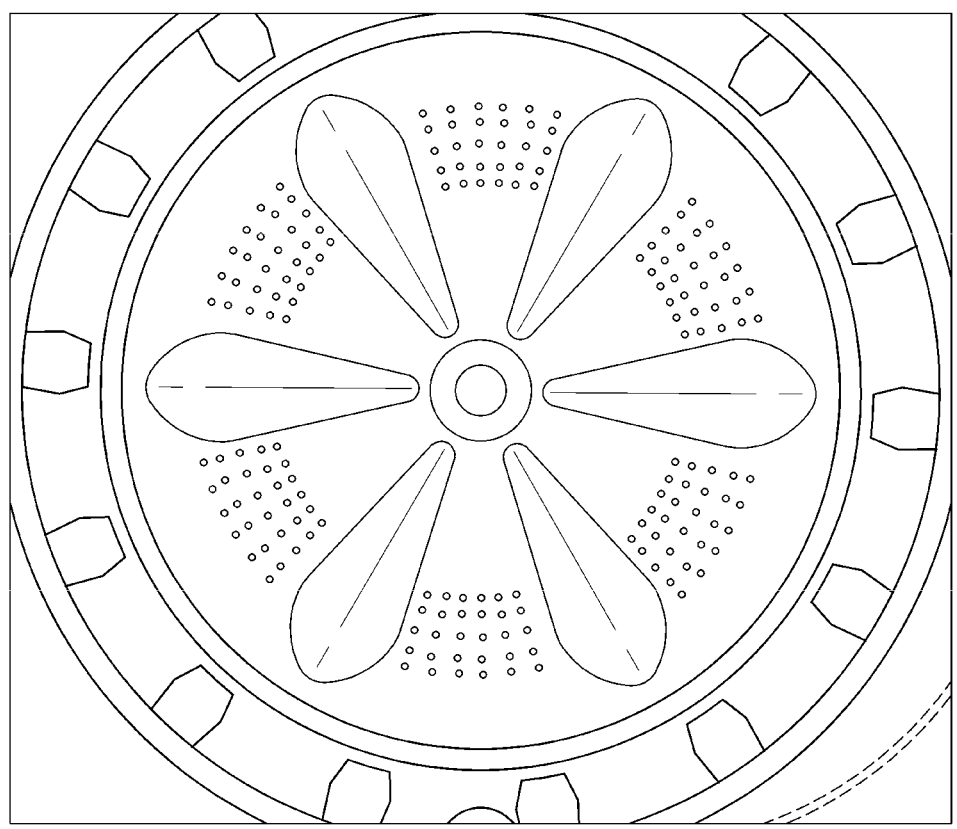
FIG. 12 illustrates a reference image of an inner tub of the washing machine according to an embodiment of the disclosure.
Figure 13:
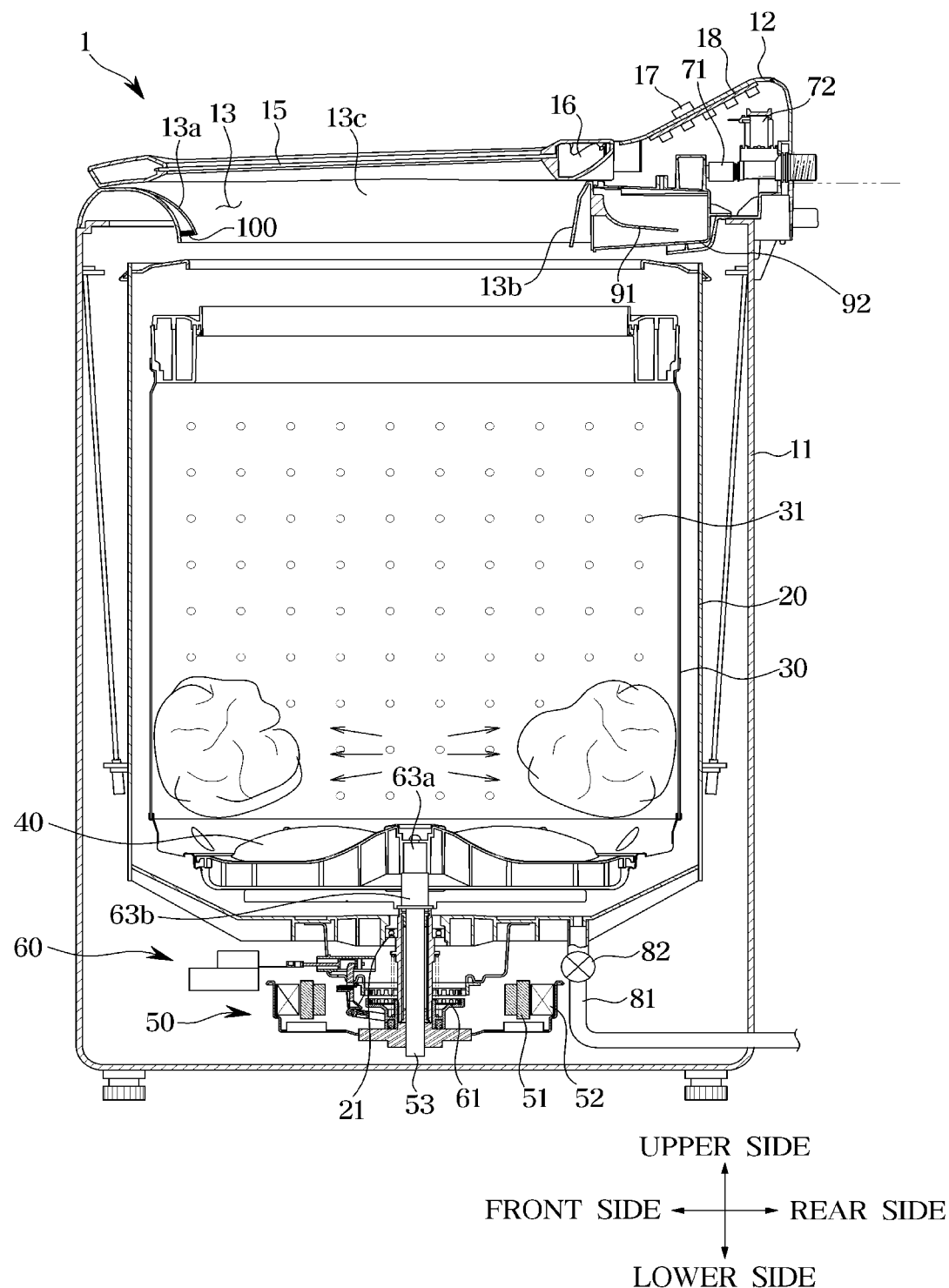
FIG. 13 illustrates an arrangement of general laundry in the inner tub during the spinning operation of the washing machine according to an embodiment of the disclosure.
Figure 14:
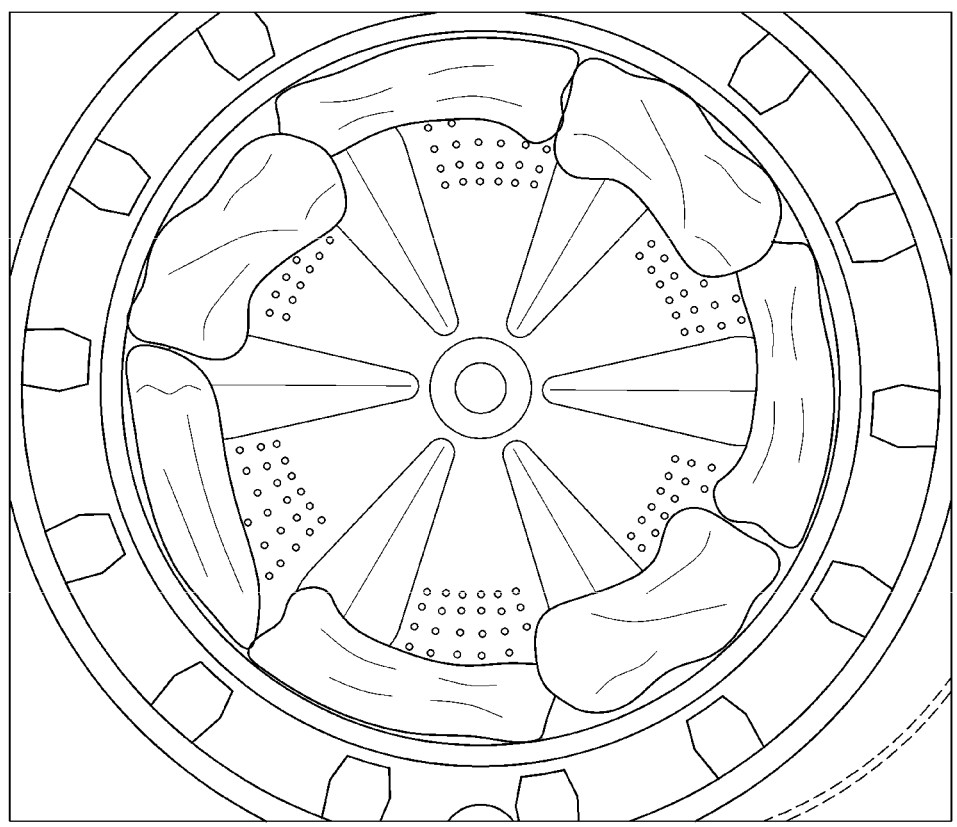
FIG. 14 illustrates an internal image of the inner tub during the spinning operation of the washing machine according to an embodiment of the disclosure.
Figure 15:
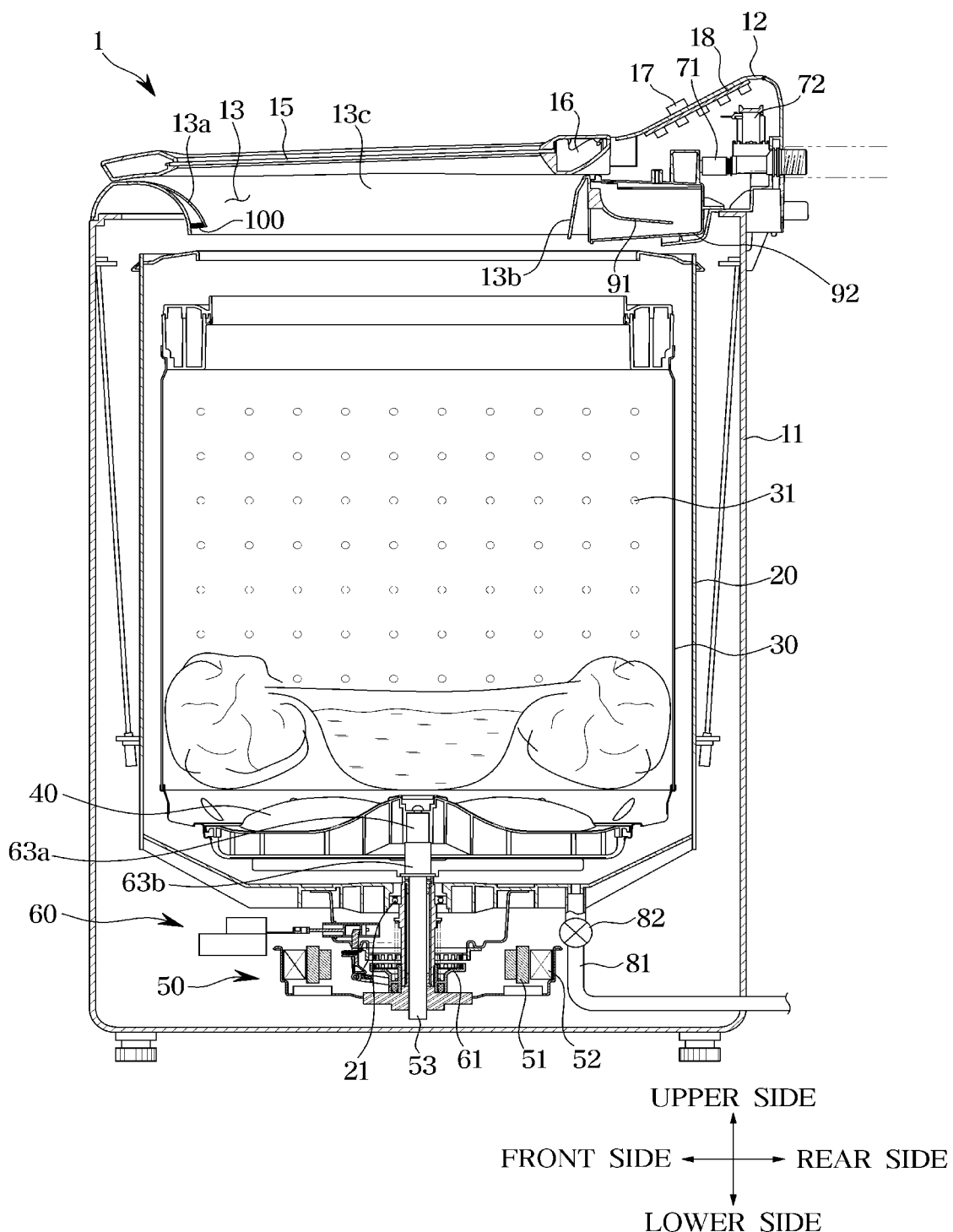
FIG. 15 illustrates an arrangement of waterproof laundry in the inner tub during the spinning operation of the washing machine according to an embodiment of the disclosure.
Figure 16:
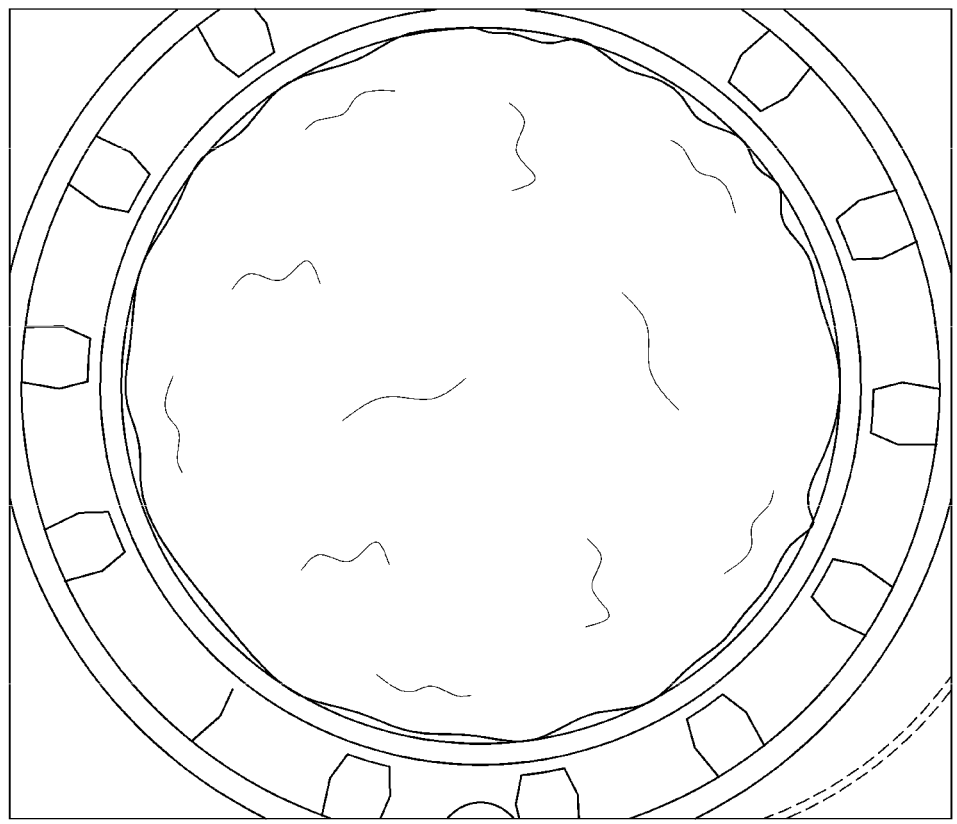
FIG. 16 illustrates an internal image of the inner tub captured during the spinning operation of the washing machine according to an embodiment of the disclosure.

FIG. 9 illustrates a spinning operation of the washing machine according to an embodiment of the disclosure. FIG. 10 illustrates an example of a rotational speed of an inner tub during the spinning operation of the washing machine according to an embodiment of the disclosure. FIG. 11 illustrates another example of a rotational speed of the inner tub during the spinning operation of the washing machine according to an embodiment of the disclosure. FIG. 12 illustrates a reference image of the inner tub 30 of the washing machine according to an embodiment of the disclosure. FIG. 13 illustrates an arrangement of general laundry in the inner tub during the spinning operation of the washing machine according to an embodiment of the disclosure. FIG. 14 illustrates an internal image of the inner tub during the spinning operation of the washing machine according to an embodiment of the disclosure. FIG. 15 illustrates an arrangement of waterproof laundry in the inner tub during the spinning operation of the washing machine according to an embodiment of the disclosure. FIG. 16 illustrates an internal image of the inner tub captured during the spinning operation of the washing machine according to an embodiment of the disclosure.

The washing machine 1 may perform the spinning operation (1100) illustrated in FIG. 9. The spinning operation (1100) will be described with reference to FIGS. 9 to 16.

The washing machine 1 rotates the inner tub 30 and the pulsator 40 at a first rotational speed RS1 for spinning (1110).

During the intermediate spinning (1024) of the washing cycle (1020), the intermediate spinning (1034) of the rinsing cycle (1030) or the final spinning (1041) of the spinning cycle (1040), the controller 170 may control the clutch 60 to transmit the rotation of the motor 50 to the inner tub 30 and the pulsator 40 without a change, and control the motor 50 to rotate the inner tub 30 and the pulsator 40. Accordingly, the inner tub 30 and the pulsator 40 may be rotated at the same speed as the motor 50.

During the spinning (1024, 1034 or 1041), the controller 170 may increase the rotational speed of the motor 50 by stages until the rotational speed of the motor 50 reaches the first rotational speed RS1. For example, the controller 170 may initially increase the rotational speed of the motor 50 to 40 rpm, as shown in FIG. 10, and when the rotational speed of the motor 50 reaches 40 rpm, the controller 170 may maintain the rotational speed of the motor 50 for a predetermined time. Thereafter, the controller 170 may increase the rotational speed of the motor 50 to 140 rpm and when the rotational speed of the motor 50 reaches 140 rpm, the controller 170 may maintain the rotational speed of the motor 50 for a predetermined time. Thereafter, the controller 170 may increase the rotational speed of the motor 50 to 300 rpm and when the rotational speed of the motor 50 reaches 300 rpm, the controller 170 may maintain the rotational speed of the motor 50 for a predetermined time.

The first rotational speed RS1 may be less than the maximum rotational speed for the spinning (1024, 1034 or 1041). For example, when the maximum rotational speed for the spinning (1024, 1034 or 1041) is set to 900 rpm, the first rotational speed RS1 may be a rotational speed less than 900 rpm. For example, the first rotational speed RS1 may be 300 rpm or 450 rpm.

Thereafter, the washing machine 1 captures an image of the inside of the inner tub 30 (1120).

The controller 170 may control the camera 100 to capture an image of the inside of the inner tub 30, and may control the camera 100 to transmit image data corresponding to the captured image of inner tub 30 to the controller 170.

The controller 170 may control the camera 100 to capture an image of the inside of the inner tub 30 while controlling the motor 50 to rotate the inner tub 30 and the pulsator 40 at the first rotational speed RS1. Alternatively, the controller 170 may control the camera 100 to capture an image of the inside of the inner tub 30 after controlling the motor 50 to stop the inner tub 30 and the pulsator 40.

For example, as shown in FIG. 10, the controller 170 may control the motor 50 to increase the rotational speed by stages until the rotational speed of the motor 50 reaches 300 rpm. During the motor 50 is rotated at 300 rpm, that is, during the inner tub 30 and the pulsator 40 are rotated at 300 rpm, the controller 170 may control the camera 100 to capture an image of the inside of the inner tub 30, and receive image data corresponding the internal image of the inner tub 30 from the camera 100.

Alternatively, as illustrated in FIG. 11, the controller 170 may control the motor 50 to stop the rotation thereof when the rotational speed of the motor 50 reaches 450 rpm. During the motor 50 is stopped, that is, during the inner tub 30 and the pulsator 40 are stopped, the controller 170 may control the camera 100 to capture an image of the inside of the inner tub 30, and receive image data corresponding the internal image of the inner tub 30 from the camera 100.

The washing machine 1 identifies whether or not the arrangement of the laundry in the inner tub 30 is the same or similar to a predetermined arrangement (1130).

The controller 170 may process the image data received from the camera 100 and identify the arrangement of the laundry based on the processing of the image data.

For example, the controller 170 may identify the arrangement of the laundry based on the difference between image data of a reference internal image that is previously captured and the image data of the internal image of the inner tub 30 that is currently captured.

As illustrated in FIG. 12, the controller 170 may previously store image data of an internal image (hereinafter referred to as a "reference image of an inner tub") of the inner tub 30 in which laundry is not placed.

The controller 170 may correct the captured internal image to match the center of the inner tub displayed on the reference image of inner tub 30 with the center of the inner tub displayed on the captured image of inner tub 30, and the controller 170 may obtain image data of a difference image indicating difference between the reference image of inner tub 30 and the captured image of inner tub 30.

The difference between the reference image of inner tub 30 and the captured image of inner tub 30 corresponds to the arrangement of the laundry. Accordingly, the controller 170 may identify the arrangement of the laundry based on the image data of the difference image between the reference image of inner tub 30 and the captured image of inner tub 30.

In the case of general laundry, after the inner tub 30 is rotated at the first rotational speed RS1, the arrangement of the laundry in the inner tub 30 may have a substantially ring shape.

When the inner tub 30 is rotated at the first rotational speed RS1, centrifugal force is applied on the laundry accommodated in the inner tub 30. Due to the centrifugal force, the general laundry accommodated in the inner tub 30 may move toward the inner wall of the inner tub 30 as shown in FIG. 13. Accordingly, an empty space without the laundry is formed in the central portion in the inner tub 30, and the laundry is located at an edge portion in the inner tub 30.

In the case of general laundry, the internal image of the inner tub 30, which is captured by the camera 100 after the inner tub 30 is rotated at the first rotational speed RS1, may include an image in which the laundry is arranged in a substantially ring shape as illustrated in FIG. 14 because the general laundry is located in the edge portion of the inside of the inner tub 30.

Based on a result of processing the difference between the reference image of inner tub 30 of the inner tub 30 and the internal image of the inner tub 30 captured after the inner tub 30 is rotated at the first rotational speed RS1, the controller 170 may identify whether the laundry is general laundry or not. Particularly, the controller 170 may identify whether the laundry is general laundry or not based on a shape of the laundry being arranged in a substantially ring shape.

For example, the controller 170 may obtain a difference image between the reference image of inner tub 30 of the inside of the inner tub 30 and the captured internal image of the inner tub 30, and calculate luminance values of a plurality of pixels contained in the difference image. The controller 170 may identify an area in which a luminance value is greater than a reference value based on the luminance values of the plurality of pixels. A luminance value of the plurality of pixels of the difference image of a part, in which the reference image of inner tub 30 of the inside of the inner tub 30 and the captured internal image of the inner tub 30 are the same or similar with each other, may be less than a reference value. A luminance value of the plurality of pixels of the difference image of a part, in which the reference image of inner tub 30 of the inside of the inner tub 30 and the captured internal image of the inner tub 30 are different from each other, may be greater than a reference value.

The area in which the luminance value is greater than the reference value corresponds to an area in which the laundry is located in the inner tub 30. The controller 170 may identify that the area in which the luminance value is greater than the reference value (the area in which the laundry is located) has a substantially ring shape. The controller 170 may identify that the area in which the laundry is located has a substantially ring shape, based on a luminance value of the center portion of the area, in which the luminance value is greater than the reference value, being less than the reference value.

As for the waterproof laundry, an arrangement of the laundry in the inner tub 30 may have a substantially disc shape after the inner tub 30 is rotated at the first rotational speed RS1.

When the inner tub 30 is rotated at the first rotational speed RS1, centrifugal force is applied to the laundry accommodated in the inner tub 30. The centrifugal force may be also applied to the waterproof laundry accommodated in the inner tub 30.

Waterproof laundry, particularly, bedspread formed of a waterproof material is larger than other laundry, and thus centrifugal force may be applied to each part of the bedspread in different directions. A position of the large-sized bedspread is not limited to a specific location in the inner tub 30, and thus the large-sized bedspread may be widely arranged in the inner tub 30. Because the centrifugal force is applied radially from the center of the inner tub 30, the centrifugal force may be applied in different directions on each part of the bedspread widely arranged in the inner tub 30.

The bedspread may be widely spread in the inner tub 30 because the centrifugal force is applied in different directions. At this time, the bedspread formed of a waterproof material may trap water used for washing or rinsing as shown in FIG. 15. Waterproof bedspreads may trap water as if it is a water bag, and thus water may not be discharged to the outside due to the bedspread.

Accordingly, the water trapped by the waterproof laundry may cause unbalance during the high-speed rotation of the inner tub 30, and the unbalance may lead to the great vibration in the outer tub 20 and the inner tub 30.

As for the waterproof laundry, the internal image of the inner tub 30 captured by the camera 100 after the inner tub 30 is rotated at the first rotational speed RS1 may include an image in which the laundry is arranged in a substantially circular shape (or a disk shape) as illustrated in FIG. 16 because the waterproof laundry is be widely spread in the inner tub 30

Based on the processing of the difference between the reference image of inner tub 30 of the inner tub 30 and the internal image of the inner tub 30 captured after the inner tub 30 is rotated at the first rotational speed RS1, the controller 170 may identify whether the laundry is waterproof laundry or not. Particularly, the controller 170 may identify whether the laundry is waterproof laundry or not based on whether or not the laundry is arranged in a substantially ring shape.

For example, the controller 170 may identify an area in which the laundry is located in the inside of the inner tub 30, based on a luminance value of a plurality of pixels contained in a difference image between the reference image of inner tub 30 of the inner tub 30 and the captured internal image of the inner tub 30. The controller 170 may identify that an area, in which the luminance value is greater than the reference value (the area in which the laundry is located), does not have a substantially ring shape. The controller 170 may identify that the area, in which the laundry is located, does not have a substantially ring shape, based on a luminance value of the center portion of the area, in which the luminance value is greater than the reference value, being greater than the reference value.

When the arrangement of the laundry in the inner tub 30 is the same as or similar to the predetermined arrangement (yes in 1130), the washing machine 1 rotates the inner tub 30 and the pulsator 40 at a second rotational speed RS2 (1140).

When the arrangement of laundry identified using the internal image of the inner tub 30 is the same as or similar to the substantially ring shape, the controller 170 may identify that the laundry accommodated in the inner tub 30 is general laundry. In other words, the controller 170 may identify that the laundry accommodated in the inner tub 30 does not include waterproof laundry.

Therefore, the controller 170 may control the motor 50 according to a general spinning cycle. The controller 170 may control the motor 50 to rotate the inner tub 30 and the pulsator 40 at the second rotational speed. The second rotational speed may be approximately 950 rpm.

The controller 170 may increase the rotational speed of the motor 50 by stages to the second rotational speed.

For example, the controller 170 may increase the rotational speed of the motor 50 from 300 rpm to 450 rpm as shown in FIG. 10, and when the rotational speed of the motor 50 reaches 450 rpm, the controller 170 may maintain the rotational speed of the motor 50 for a predetermined time. Thereafter, the controller 170 may repeat the operation of increasing the rotational speed of the motor 50 by stages, particularly, 700 rpm, 900 rpm and 950 rpm in order, and maintaining the rotational speed of the motor 50 for a predetermined time. Thereafter, the controller 170 may gradually reduce the rotational speed of the motor 50.

Alternatively, as illustrated in FIG. 11, the controller 170 may repeat the operation of increasing the rotational speed of the motor 50 by stages, particularly, 40 rpm, 140 rpm, 300 rpm, 450 rpm, 700 rpm, 900 rpm and 950 rpm in order, and maintaining the rotational speed of the motor 50 for a predetermined time. Thereafter, the controller 170 may gradually reduce the rotational speed of the motor 50.

When the arrangement of the laundry in the inner tub 30 is not the same or similar to a predetermined arrangement (no in 1130), the washing machine 1 rotates the inner tub 30 and the pulsator 40 at a third rotational speed RS3 (1150).

When the arrangement of laundry identified using the internal image of the inner tub 30 is not the same as or similar to the substantially ring shape, the controller 170 may identify that the laundry accommodated in the inner tub 30 includes waterproof laundry. In other words, when the arrangement of laundry is a substantially circular shape, the controller 170 may identify that the laundry accommodated in the inner tub 30 includes waterproof laundry.

The controller 170 may control the motor 50 according to the spinning cycle in which the rotational speed of the inner tub 30 for spinning is reduced. The controller 170 may control the motor 50 to rotate the inner tub 30 and the pulsator 40 at the third rotational speed less than the second rotational speed. The third rotational speed may be approximately 450 rpm.

For example, the controller 170 may increase the rotational speed of the motor 50 from 300 rpm to 450 rpm as shown in FIG. 11, and when the rotational speed of the motor 50 reaches 450 rpm, the controller 170 may maintain the rotational speed of the motor 50 for a predetermined time. Thereafter, the controller 170 may gradually reduce the rotational speed of the motor 50.

Alternatively, as illustrated in FIG. 11, the controller 170 may repeat the operation of increasing the rotational speed of the motor 50 by stages, particularly, 40 rpm, 140 rpm, 300 rpm, and 450 rpm in order, and maintaining the rotational speed of the motor 50 for a predetermined time. Thereafter, the controller 170 may gradually reduce the rotational speed of the motor 50.

After stopping the rotation of the inner tub 30 and the pulsator 40, the washing machine 1 may continue the rinsing cycle, or inform the user of the completion of the washing.

As mentioned above, the washing machine 1 may include the camera 100 configured to capture an image of the inside of the inner tub 30, and the washing machine 1 may adjust the rotational speed of the motor 50 for the spinning based on the internal image of the inner tub 30. The washing machine 1 may identify the arrangement of laundry based on the internal image of the inner tub 30 captured by the camera 100, and may reduce the rotational speed of the motor 50 based on the identified arrangement of the laundry. Accordingly, it is possible to prevent the inner tub 30 and the outer tub 20 from being vibrated caused by the water collected in the waterproof laundry. Further, it is possible to prevent the damage of the washing machine 1 caused by the vibration of the inner tub 30 and the outer tub 20.

In addition, a method for identifying whether or not laundry includes waterproof laundry is not limited to using the camera 100.

For example, the washing machine may identify whether or not the laundry includes waterproof laundry through an infrared sensor. The infrared sensor may emit infrared rays toward the center of the bottom of the inner tub (the center of the pulsator). The infrared sensor may receive infrared rays reflected by the bottom of the inner tub or the waterproof laundry, and identify whether the object reflecting infrared rays is the bottom of the inner tub or the waterproof laundry. When the object is identified as the waterproof laundry, the washing machine may limit the rotational speed of the motor during the spinning cycle.

Alternatively, the washing machine may identify whether or not the laundry includes the waterproof laundry through an ultrasonic sensor or a radar sensor.

Figure 17:
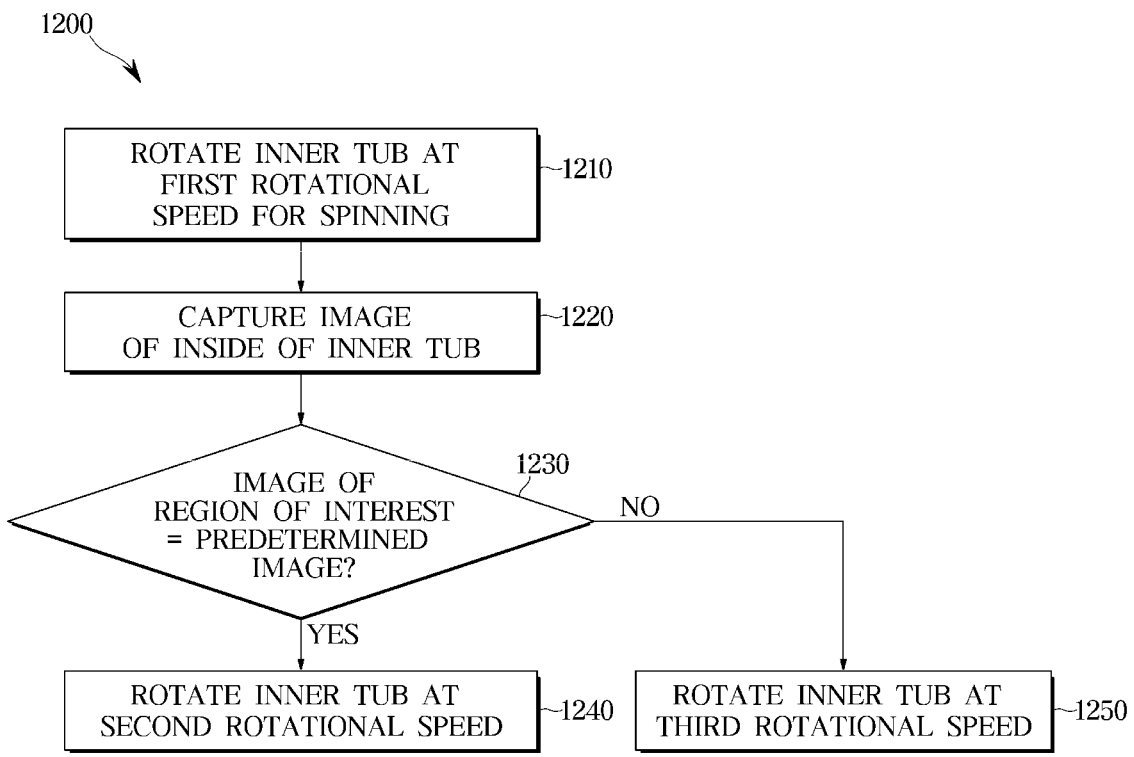
FIG. 17 illustrates a spinning operation of the washing machine according to an embodiment of the disclosure.
Figure 18:
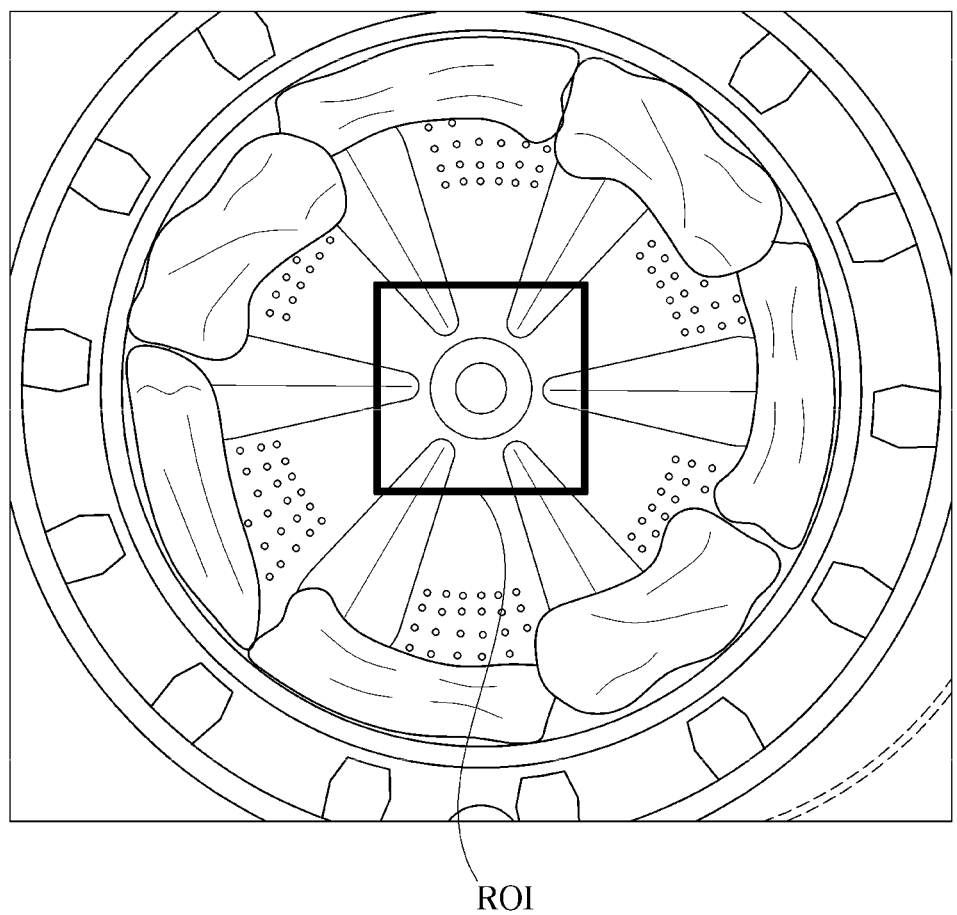
FIG. 18 illustrates an internal image of the inner tub, in which general laundry is placed, of the washing machine according to an embodiment of the disclosure.
Figure 19:
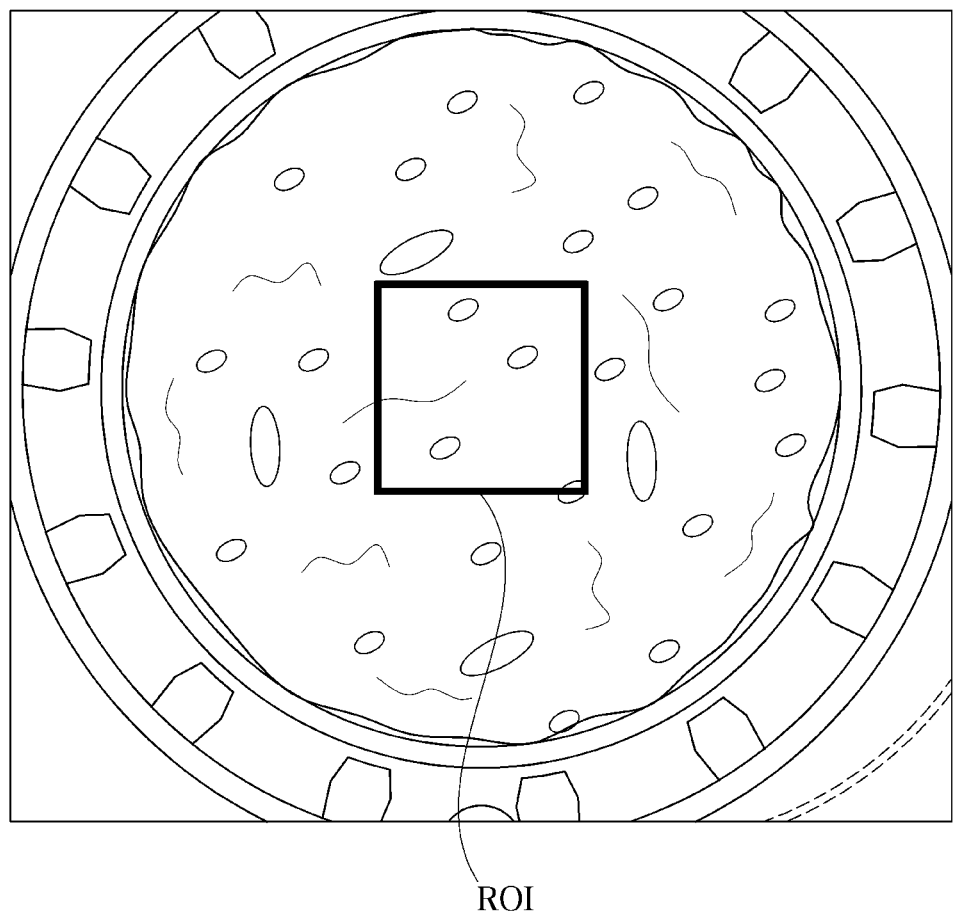
FIG. 19 illustrates an internal image of the inner tub, in which waterproof laundry is placed, of the washing machine according to an embodiment of the disclosure.

FIG. 17 illustrates a spinning operation of the washing machine according to an embodiment of the disclosure. FIG. 18 illustrates an internal image of the inner tub, in which general laundry is placed, of the washing machine according to an embodiment of the disclosure. FIG. 19 illustrates an internal image of the inner tub, in which waterproof laundry is placed, of the washing machine according to an embodiment of the disclosure.

The washing machine 1 may perform a spinning operation (1200) illustrated in FIG. 17. The spinning operation (1200) will be described with reference to FIGS. 17 to 19.

The washing machine 1 rotates the inner tub 30 and the pulsator 40 at the first rotational speed RS1 for the spinning (1210). Thereafter, the washing machine 1 captures an image of the inside of the inner tub 30 (1220).

The controller 170 may control the camera 100 to capture an image of the inside of the inner tub 30 and receive image data of the image of the inner tub 30 from the camera 100.

Operations 1210 and 1220 may be the same as operations 1110 and 1120 illustrated in FIG. 9, and descriptions thereof will be omitted.

The washing machine 1 identifies whether the internal image of the inner tub 30 includes a predetermined image (1230).

The controller 170 may control the camera 100 to capture an image of the inner tub 30 and process image data received from the camera 100. In addition, the controller 170 may identify whether or not the captured image of inner tub 30 includes the predetermined image, based on the processing of the image data. The predetermined image may include an image of the pulsator 40.

The controller 170 may set a region of interest (ROI) in the internal image of the inner tub 30.

As described above, the general laundry may be disposed along the inner wall of the inner tub 30 after the inner tub 30 is rotated at the first rotational speed RS1. On the other hand, the waterproof laundry may be widely spread on the bottom of the inner tub 30 after the inner tub 30 is rotated at the first rotational speed RS1. Therefore, a central portion of the internal image of the inner tub 30 in which the waterproof laundry is accommodated may be different from a central portion of the internal image of the inner tub 30 in which the general laundry is accommodated. Accordingly, the controller 170 may set an area of the central portion of the inner tub 30 in the internal image of the inner tub 30 as a ROI.

The controller 170 may identify whether the laundry accommodated in the inner tub 30 includes waterproof laundry, based on an image processing of the ROI.

When the waterproof laundry is not accommodated in the inner tub 30, centrifugal force due to the rotation of the inner tub 30 may be applied to the laundry, and the laundry may be disposed along the inner wall of the inner tub 30. Therefore, the pulsator 40 may be exposed in the central portion of the inner tub 30. When the ROI is set as the central portion of the inner tub 30, the image of the ROI may include an image of the pulsator 40, as shown in FIG. 18.

The controller 170 may compare the image of the ROI with the image of the pulsator 40, and when the image of the ROI is identical or similar to the image of the pulsator 40, the controller 170 may identify that the waterproof laundry is not accommodated in the inner tub 30.

On the other hand, when the waterproof laundry is accommodated in the inner tub 30, the centrifugal force due to the rotation of the inner tub 30 may be applied in different directions to the waterproof laundry. Therefore, the waterproof laundry may be widely spread in the inner tub 30 as shown in FIG. 18. Particularly, the waterproof laundry in the central portion of the inner tub 30 may be tightly spread relatively. Therefore, the pulsator 40 is covered by the waterproof laundry. When the central portion of the inner tub 30 is set as the ROI, the image of the ROI may not include the image of the pulsator 40 as illustrated in FIG. 19.

The controller 170 may compare the image of the ROI with the image of the pulsator 40, and when the image of the ROI is different from the image of the pulsator 40, the controller 170 may identify that the waterproof laundry is accommodated in the inner tub 30.

When the internal image of the inner tub 30 includes a predetermined image (yes in 1230), the washing machine 1 rotates the inner tub 30 and the pulsator 40 at a second rotational speed RS2 (1240).

When the image inside the inner tub 30 includes the image of the pulsator 40, the controller 170 may identify that the laundry accommodated in the inner tub 30 is general laundry. In other words, the controller 170 may identify that the laundry accommodated in the inner tub 30 does not include waterproof laundry.

Therefore, the controller 170 may control the motor 50 according to the general spinning cycle. The controller 170 may control the motor 50 to rotate the inner tub 30 and the pulsator 40 at a second rotational speed. The second rotational speed may be approximately 950 rpm.

Operation 1240 may be the same as operation 1140 illustrated in FIG. 9, and a detailed description thereof will be omitted.

When the internal image of the inner tub 30 does not include the predetermined image (no in 1230), the washing machine 1 rotates the inner tub 30 and the pulsator 40 at a third rotational speed RS3 (1250).

When the internal image of the inner tub 30 does not include the image of the pulsator 40, the controller 170 may identify that the laundry accommodated in the inner tub 30 includes the waterproof laundry. In other words, when the arrangement of the laundry is a substantially circular shape, the controller 170 may identify that the laundry accommodated in the inner tub 30 includes the waterproof laundry.

The controller 170 may control the motor 50 according to the spinning cycle in which the rotational speed of the inner tub 30 for spinning is reduced. The controller 170 may control the motor 50 to rotate the inner tub 30 and the pulsator 40 at the third rotational speed less than the second rotational speed. The third rotational speed may be approximately 450 rpm.

Operation 1250 may be the same as operation 1150 illustrated in FIG. 9, and a description thereof will be omitted.

As mentioned above, the washing machine 1 may extract an image of ROI from the internal image of the inner tub 30 captured by the camera 100 and reduce the rotational speed of the motor 50 based on a result of comparison between the image of the ROI and the image of the pulsator 40. Accordingly, it is possible to prevent the inner tub 30 and the outer tub 20 from being vibrated caused by the water collected in the waterproof laundry. Further, it is possible to reduce an amount of calculation for identifying the waterproof laundry.

In addition, a method for identifying whether or not the laundry includes waterproof laundry is not limited to comparing the image of the ROI with the image of the pulsator 40.

For example, the controller 170 may identify whether or not the laundry accommodated in the inner tub 30 includes the waterproof laundry, based on the processing of the image of the ROI.

Among the waterproof laundry, a typical laundry that may cause damage to the washing machine 1 may be a bedspread. A waterproof bedspread is larger in size than other waterproof laundry, so the waterproof bedspread may collect a large amount of water and cause more unbalance.

Bedspreads generally have a white color, and it is common to have no pattern on the surface. Therefore, luminance values of a plurality of pixels included in the white bedspread image may have a relatively large value.

The controller 170 may set the central portion of the captured internal image of the inner tub 30 as a ROI, and identify whether or not the waterproof laundry is accommodated in the inner tub 30 based on the luminance values of the plurality of pixels included in the image of the ROI.

For example, when an average value of luminance values of the plurality of pixels included in the image of the ROI is less than a reference value, the controller 170 may identify that the waterproof laundry is not accommodated in the inner tub 30, and increase the rotational speed of the motor to a second rotational speed (for example, 950 rpm) during the spinning.

On the other hand, when the average value of luminance values of the plurality of pixels included in the image of the ROI is greater than the reference value, the controller 170 may identify that the waterproof laundry is accommodated in the inner tub 30, and limit the rotational speed of the motor to a third rotational speed (for example, 450 rpm) during the spinning.

Figure 20:
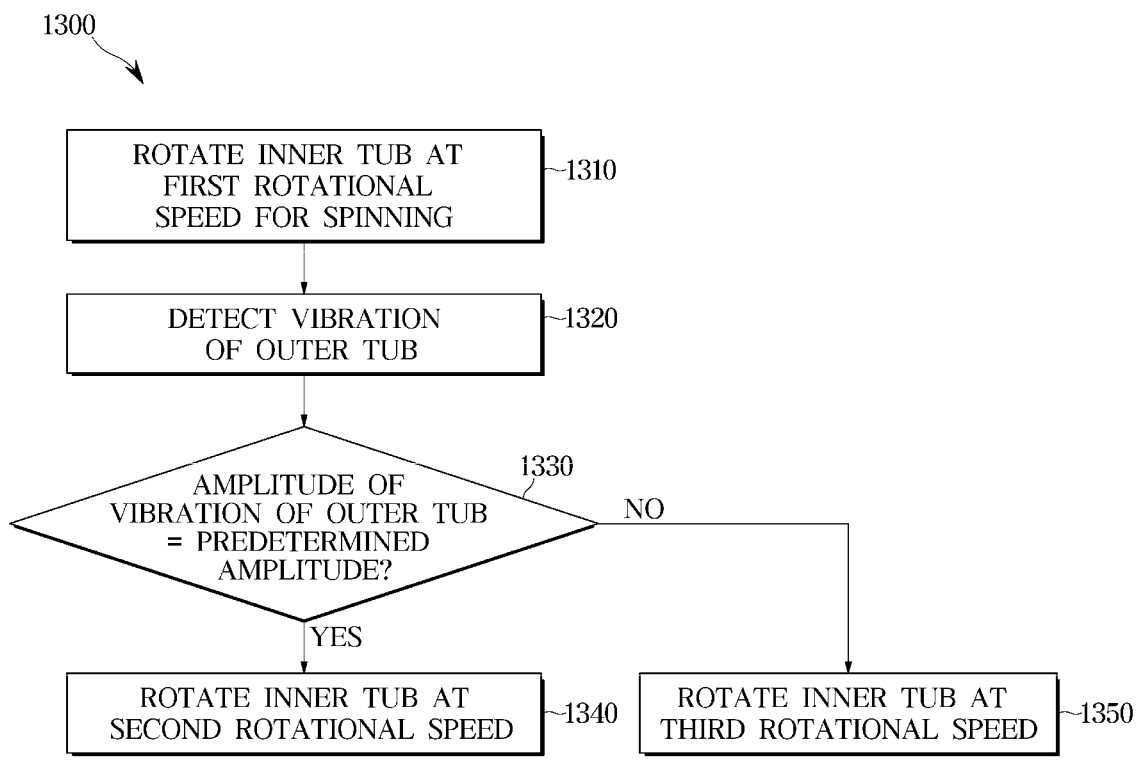
FIG. 20 illustrates a spinning operation of the washing machine according to an embodiment of the disclosure.

FIG. 20 illustrates a spinning operation of the washing machine according to an embodiment of the disclosure.

The washing machine 1 may perform a spinning operation (1300) illustrated in FIG. 20. The spinning operation (1300) will be described with reference to FIG. 20.

The washing machine 1 rotates the inner tub 30 and the pulsator 40 at a first rotational speed RS1 for the spinning (1310).

Operation 1310 may be the same as operation 1110 illustrated in FIG. 9, and a description thereof will be omitted.

The washing machine 1 detects the vibration of the outer tub 20 (1320).

The washing machine 1 may detect the vibration of the outer tub 20 using the vibration sensor 130.

The vibration sensor 130 may be installed on the outside of the outer tub 20 and may obtain acceleration data from the vibration of the outer tub 20.

For example, the vibration sensor 130 may transmit acceleration data to the controller 170. The controller 170 may identify the amplitude of the vibration of the outer tub 20 based on the acceleration data received from the vibration sensor 130. The controller 170 may obtain acceleration information caused by the vibration of the outer tub 20 from the received acceleration data, and calculate the amplitude of the vibration of the outer tub 20 by integrating the acceleration of the outer tub 20 twice with respect to a time.

Alternatively, the vibration sensor 130 may identify the amplitude of vibration of the outer tub 20 based on the acceleration data. The vibration sensor 130 may calculate the amplitude of the vibration of the outer tub 20 by integrating the acceleration of the outer tub 20 twice with respect to a time. The vibration sensor 130 may transmit information on the amplitude of the outer tub 20 to the controller 170.

The washing machine 1 identifies whether or not the vibration amplitude of the outer tub 20 is greater than the reference amplitude (1330).

The controller 170 may calculate the amplitude of the outer tub 20 based on the acceleration data received from the vibration sensor 130, or obtain the amplitude of the outer tub 20 from the vibration sensor 130.

The controller 170 may compare the amplitude of the outer tub 20 with the reference amplitude, and identify whether or not the amplitude of the outer tub 20 is greater than the reference amplitude.

The controller 170 may identify whether the laundry accommodated in the inner tub 30 includes the waterproof laundry based on whether or not the amplitude of the outer tub 20 is greater than the reference amplitude.

When the laundry accommodated in the inner tub 30 does not include the waterproof laundry, the laundry may be disposed along the inner wall of the inner tub 30 and the unbalance of the inner tub 30 may be reduced during the inner tub 30 is rotated at the first rotational speed RS1. Therefore, the vibration of the inner tub 30 and the outer tub 20 may be reduced.

On the other hand, when the laundry accommodated in the inner tub 30 includes the waterproof laundry, the waterproof laundry may collect water during discharging water. In addition, during the inner tub 30 is rotated at the first rotational speed RS1, the waterproof laundry may be spread over the entire inner tub 30, and water collected by the waterproof laundry may cause the unbalance of the inner tub 30. Therefore, the vibration of the inner tub 30 and the outer tub 20 may be greatly increased.

When the amplitude of the outer tub 20 is greater than the reference amplitude (yes in 1330), the washing machine 1 rotates the inner tub 30 and the pulsator 40 at a third rotational speed RS3 (1350).

When the amplitude of the outer tub 20 is greater than the reference amplitude, the controller 170 may identify that the laundry accommodated in the inner tub 30 includes the waterproof laundry.

The controller 170 may control the motor 50 according to the spinning cycle in which the rotational speed of the inner tub 30 for the spinning is reduced. The controller 170 may control the motor 50 to rotate the inner tub 30 and the pulsator 40 at the third rotational speed. The third rotational speed may be approximately 450 rpm.

Operation 1350 may be the same as operation 1150 illustrated in FIG. 9, and a description thereof will be omitted.

When the amplitude of the outer tub 20 is not greater than the reference amplitude (no in 1330), the washing machine 1 rotates the inner tub 30 and the pulsator 40 at a second rotational speed RS2 (1340).

When the amplitude of the outer tub 20 is not greater than the reference amplitude, the controller 170 may identify that the laundry accommodated in the inner tub 30 does not include the waterproof laundry.

Therefore, the controller 170 may control the motor 50 according to a general spinning process. The controller 170 may control the motor 50 to rotate the inner tub 30 and the pulsator 40 at the second rotational speed RS2 greater than the third rotational speed RS3. The second rotational speed RS2 may be approximately 950 rpm.

Operation 1340 may be the same as operation 1140 illustrated in FIG. 9, and a detailed description thereof will be omitted.

As mentioned above, the washing machine 1 may include a vibration sensor, and identify whether or not the waterproof laundry is accommodated in the inner tub 30 based on an output of the vibration sensor. When the washing machine 1 identifies that the waterproof laundry is accommodated in the inner tub 30, the washing machine 1 may reduce the rotational speed of the motor 50, and thus the vibration of the inner tub 30 and the outer tub 20 caused by the water collected in the waterproof laundry may be prevented.

Figure 21:
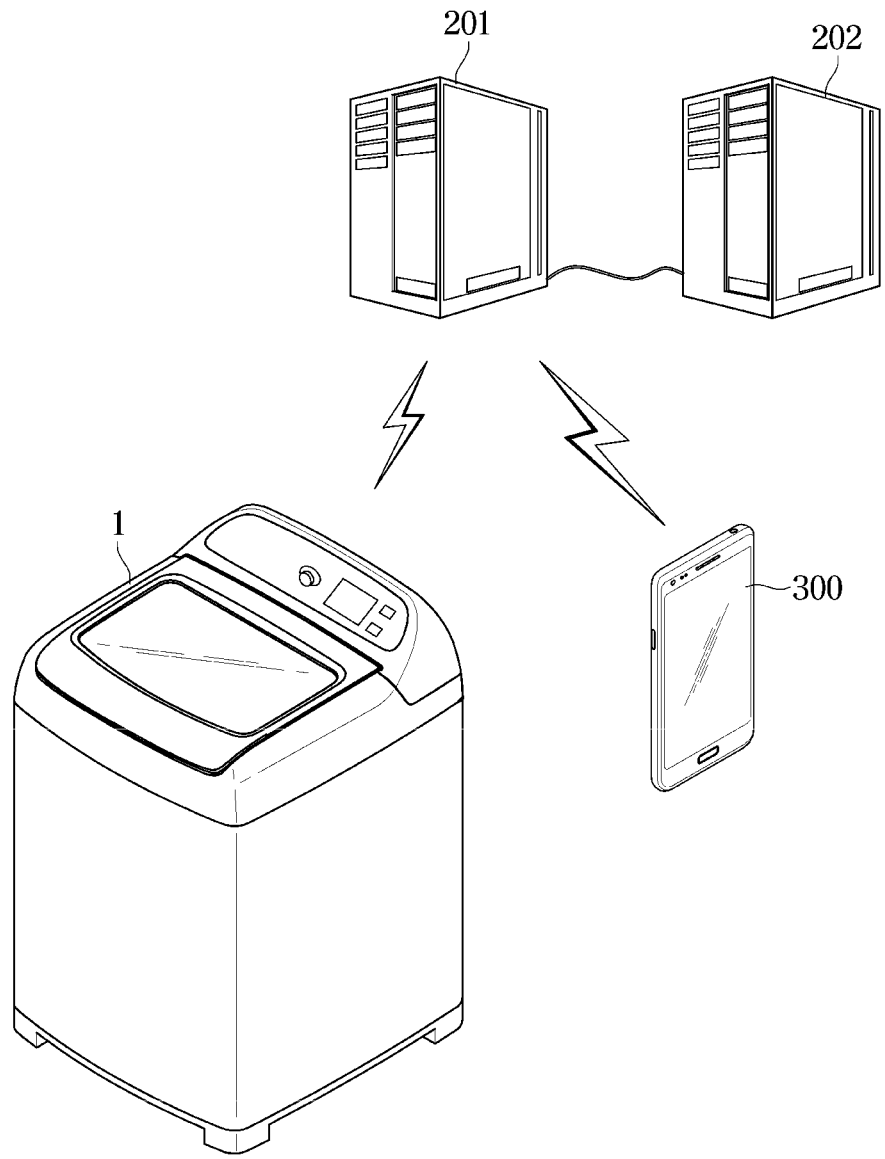
FIG. 21 illustrates that the washing machine according to an embodiment of the disclosure communicates with external devices.
Figure 22:
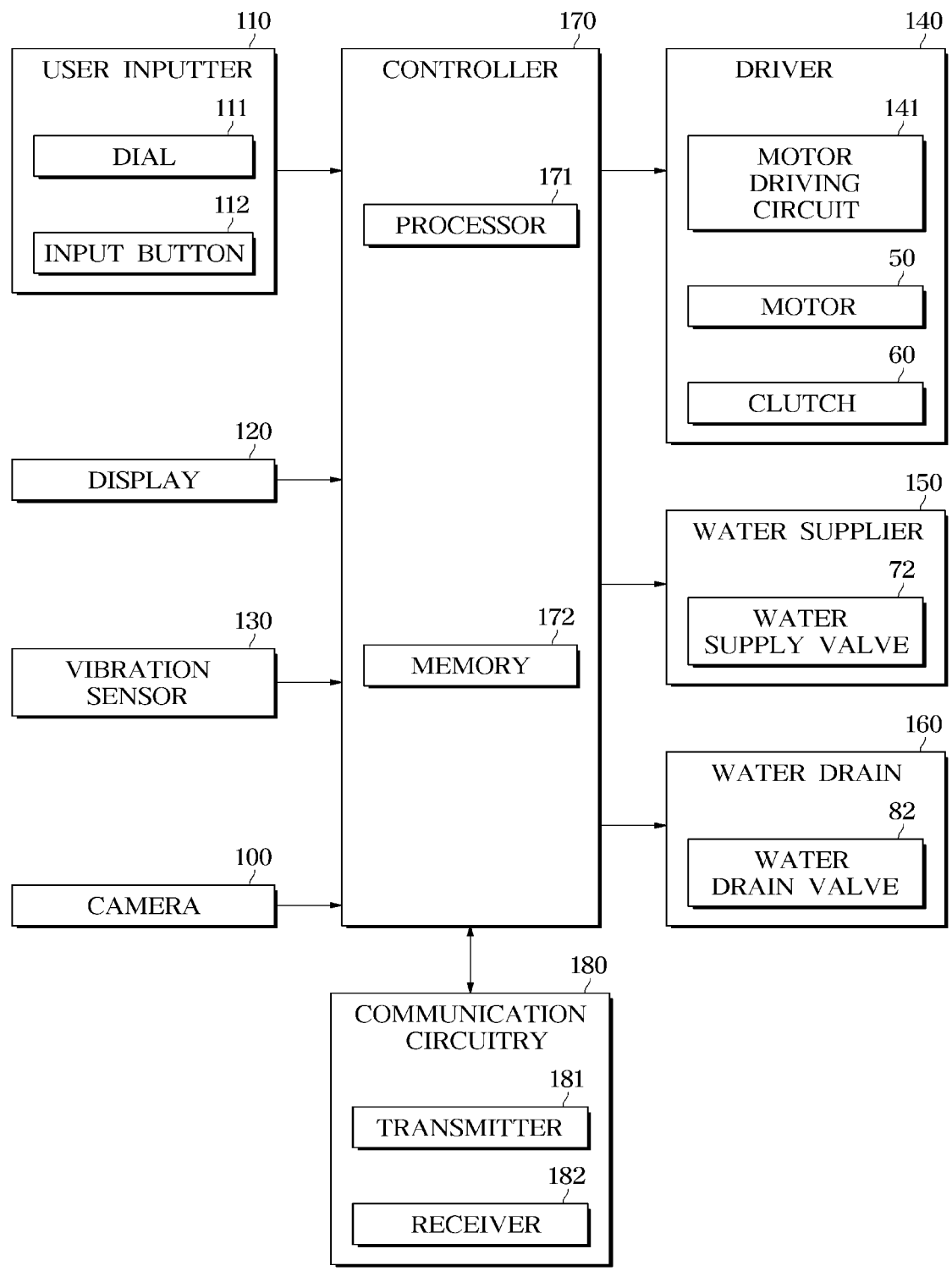
FIG. 22 illustrates a control configuration of the washing machine according to an embodiment of the disclosure.

FIG. 21 illustrates that the washing machine according to an embodiment of the disclosure communicates with external devices. FIG. 22 illustrates a control configuration of the washing machine according to an embodiment of the disclosure.

As illustrated in FIG. 21, the washing machine 1 may communicate with a first server device 201 and/or a user device 300.

The washing machine 1 may be connected to the first server device 201 and/or the user device 300 through a communication network, and the communication network may include both a wired communication network and a wireless communication network. The wired communication network includes a communication network such as a data network or a telephone network, and the wireless communication network may include a communication network that transmits and receives signals through radio waves. The wired communication network and the wireless communication network may be connected to each other. The wired communication network may include a wide area network (WAN) such as the Internet, and the wireless communication network may include an access point (AP) connected to the wide area network (WAN).

The first server device 201 may transmit and receive data and/or messages to and from other devices through a communication network. For example, the first server device 201 may transmit and receive data and/or messages to and from the washing machine 1, the user device 300, and/or a second server device 202 through a communication network.

The first server device 201 may store user account information of the washing machine 1 and the user device 300. The user account information may include identification information of the user, identification information of the washing machine 1 and identification information of the user device 300. The identification information of the washing machine 1 may include an internet protocol (IP) address and/or a Media Access Control (MAC) address of the washing machine 1.

The first server device 201 may control the washing machine 1 in conjunction with the user device 300 using the user account information. For example, the first server device 201 may receive a control message regarding the washing machine 1 from the user device 300 and transmit the received control message to the washing machine 1. In addition, the first server device 201 may receive a control message regarding the user device 300 from the washing machine 1 and transmit the received control message to the user device 300.

The first server device 201 may receive image data and an image processing message from the washing machine 1 and/or the user device 300, process the image data in response to the image processing message, and transmit the processed image data to the washing machine 1 and/or the user device 300.

For example, the first server device 201 may receive a message for identifying the arrangement of the laundry along with the reference image of inner tub 30 and the captured image of inner tub 30 from the washing machine 1. The first server device 201 may identify whether the arrangement of the laundry is a ring shape based on the difference image between the reference image of inner tub 30 and the captured image of inner tub 30. Thereafter, the first server device 201 may transmit a message indicating whether or not the arrangement of the laundry is a ring shape, to the washing machine 1.

Alternatively, the first server device 201 may receive a message for identifying (recognizing) the laundry along with the captured image of inner tub 30 from the washing machine 1. The first server device 201 may transmit a message for identifying laundry along with the image of the inner tub 30, which is received from the washing machine 1, to the second server device 202. The second server device 202 may identify (recognize) the laundry contained in the inner image in response to the message of the first server device 201, and transmit identification information to the first server device 201. The first server device 201 may transmit the identification information received from the second server device 202 to the washing machine 1.

The second server device 202 may include object recognition configured to identify an object from an image. For example, the second server device 202 may include object recognition configured to identify an object included in an image using machine learning.

The second server device 202 may receive the image of the inner tub 30 from the image and identify an object included in the image of the inner tub 30. For example, through the machine learning, the second server device 202 may identify whether the laundry included in the image of the inner tub 30 is the waterproof laundry.

The second server device 202 may include object identification engine for identifying an object from the image, and training data for training the object identification engine.

The object identification engine may identify an object from an image using trained learning or untrained learning. For example, the object identification engine may identify laundry contained in the inner image by pre-training or post-training, and output information on the laundry such as name of the identified laundry.

The object identification engine may include various learning algorithms for object identification through images. For example, the object identification engine 231 may include a neural network algorithm, a support vector machine (SVM) algorithm, an AdaBoost algorithm, and a random forest algorithm. The object identification engine may be pre-trained by training data.

Each of the first server device 201 and the second server device 202 may be called as various names such as a server, a client, a workstation, a personal computer, a cloud, a data drive, or a data station.

The user device 300 may process data received from another device through a communication network, and display the processed data to the user. The user device 300 may be carried by a user or may be disposed in the user's home or office, and the user may easily access the user device 300. The user device 300 may be called as a workstation, a personal computer, a terminal, a portable telephone, a smart phone, a handheld device, or a wearable device.

The user device 300 may receive a message from the washing machine 1 and/or the first server device 201, display an image corresponding to the received message, or output sound corresponding to the received message.

In order to communicate with the first server device 201 and/or the user device 300, the washing machine 1 includes the user inputter 110, the display 120, the vibration sensor 130, the camera 100, the driver 140, the water supplier 150, the water drain 160, the controller 170, and a communication circuitry 180, as shown in FIG. 22.

The user inputter 110, the display 120, the vibration sensor 130, the camera 100, the driver 140, the water supplier 150, the water drain 160, and the controller 170 may be the same as those described with reference to FIG. 7, and thus a description thereof will be omitted.

The communication circuitry 180 may exchange data with the first server device 201 and/or the user device 300. For example, the communication circuitry 180 may transmit the internal image of the inner tub 30 captured by the camera 100 to the first server device 201, and receive information on laundry included in the image of the inner tub 30 from the first server device 201.

The communication circuitry 180 may be connected to a wired communication network and communicate with the first server device 201 and/or the user device 300 through the wired communication network. For example, the communication circuitry 180 may be connected to the wired communication network through Ethernet (IEEE 802.3 standard), and receive data from the first server device 201 and/or the user device 300 through the wired communication network.

The communication circuitry 180 may wirelessly communicate with a base station or an access point (AP) and may be connected to the wired communication network through the base station or the access point. The communication circuitry 180 may also communicate with the first server device 201 and/or the user device 300 connected to the wired communication network through a base station or an access point.

For example, the communication circuitry 180 may wirelessly communicate with an access point (AP) using WiFi™ (IEEE 802.11 standard), or communicate with a base station using CDMA, WCDMA, GSM, Long Term Evolution (LET), and WiBro. The communication circuitry 180 may also receive data from the first server device 201 and/or the user device 300 via the base station or the access point.

The communication circuitry 180 includes a transmitter 181 configured to transmit data to the first server device 201 and/or the user device 300, and a receiver 182 configured to receive data from the first server device 201 and/or the user device 300.

Figure 23:
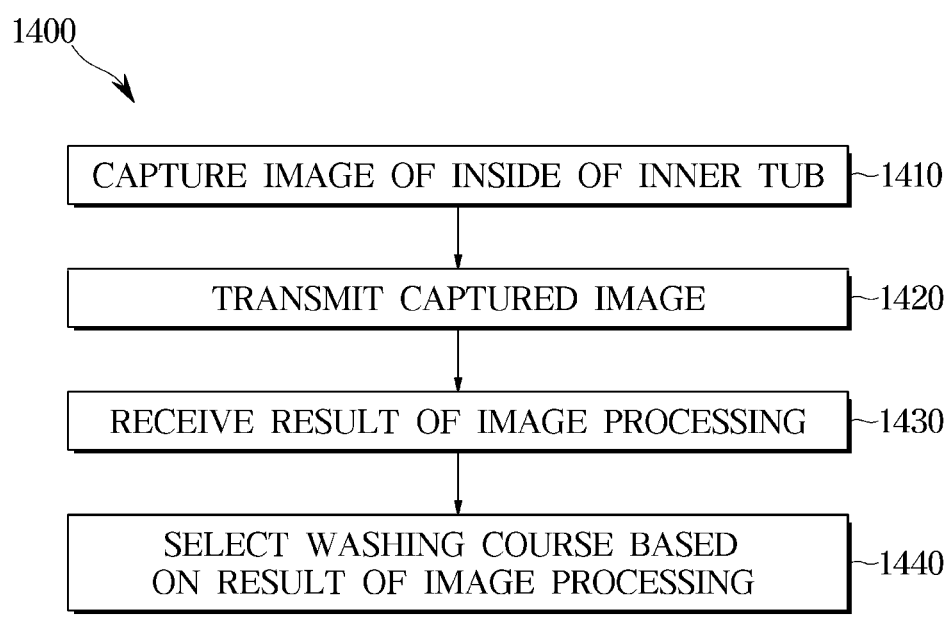
FIG. 23 illustrates selecting a washing course of the washing machine according to an embodiment of the disclosure.

FIG. 23 illustrates selecting a washing course of the washing machine according to an embodiment of the disclosure.

The washing machine 1 may perform washing course selection (1400) illustrated in FIG. 23. The washing course selection (1400) will be described with reference to FIG. 23.

The washing machine 1 capture an image of the inside of the inner tub 30 (1410).

The controller 170 may control the camera 100 to capture an image of the inside of the inner tub 30 and receive image data of the image of the inner tub 30 from the camera 100.

Operation 1410 may be the same as operation 1120 illustrated in FIG. 9, and thus a description thereof will be omitted.

The washing machine 1 transmits the captured internal image of the inner tub 30 to the first server device 201 (1420).

The controller 170 may control the communication circuitry 180 to transmit image data of an internal image (hereinafter referred to as an "image of inner tub") of the inner tub 30 to the first server device 201. The communication circuitry 180 may transmit the image of the inner tub 30 and a message for identifying laundry contained in the image of the inner tub 30 through the wired communication network and/or the wireless communication network in response to a control signal from the controller 170.

The first server device 201 may receive the image data of the image of the inner tub 30 and a message for identifying the laundry from the washing machine 1 and transmit the image data of the image of the inner tub 30 to the second server device 202 in response to the message of the washing machine 1. The second server device 202 may identify (recognize) the laundry included in the image of the inner tub 30 by using machine learning in response to the message of the first server device 201.

The washing machine 1 receives an image processing result (identification information of laundry included in the image of the inner tub) from the first server device 201 (1430).

The second server device 202 may transmit the identification information on the laundry included in the image of the inner tub 50 to the first server device 201. The first server device 201 may transmit the identification information received from the second server device 202 to the washing machine 1.

The controller 170 may receive the identification information of laundry included in the image of the inner tub 30 from the first server device 201 through the communication circuitry 180.

The washing machine 1 selects a washing course based on the received image processing result (identification information of laundry included in the image of the inner tub) (1440).

The controller 170 may select a washing course based on the identification information of the laundry received from the first server device 201. For example, when the identified laundry includes a blanket, the controller 170 may select a washing course for washing the blanket.

When the identified laundry includes waterproof laundry, the controller 170 may set the rotational speed of the motor 50 for spinning as the third rotational speed RS3 less than the second rotational speed RS2.

As mentioned above, the washing machine 1 may identify the laundry using the machine learning of the server device, and select the washing course appropriate for the identified laundry. Particularly, the washing machine 1 may identify the waterproof laundry by using the machine learning, and in response to the identification of the waterproof laundry, the washing machine 1 may reduce the rotational speed of the inner tub 30 during the spinning.

Accordingly, the washing machine 1 may accurately identify the laundry and may wash the laundry using an optimal washing course. Further, the washing machine 1 may accurately identify whether or not the waterproof laundry is included in the laundry, and during the spinning, the washing machine 1 may reduce the rotational speed of the inner tub 30 for the waterproof laundry.

Figure 24:
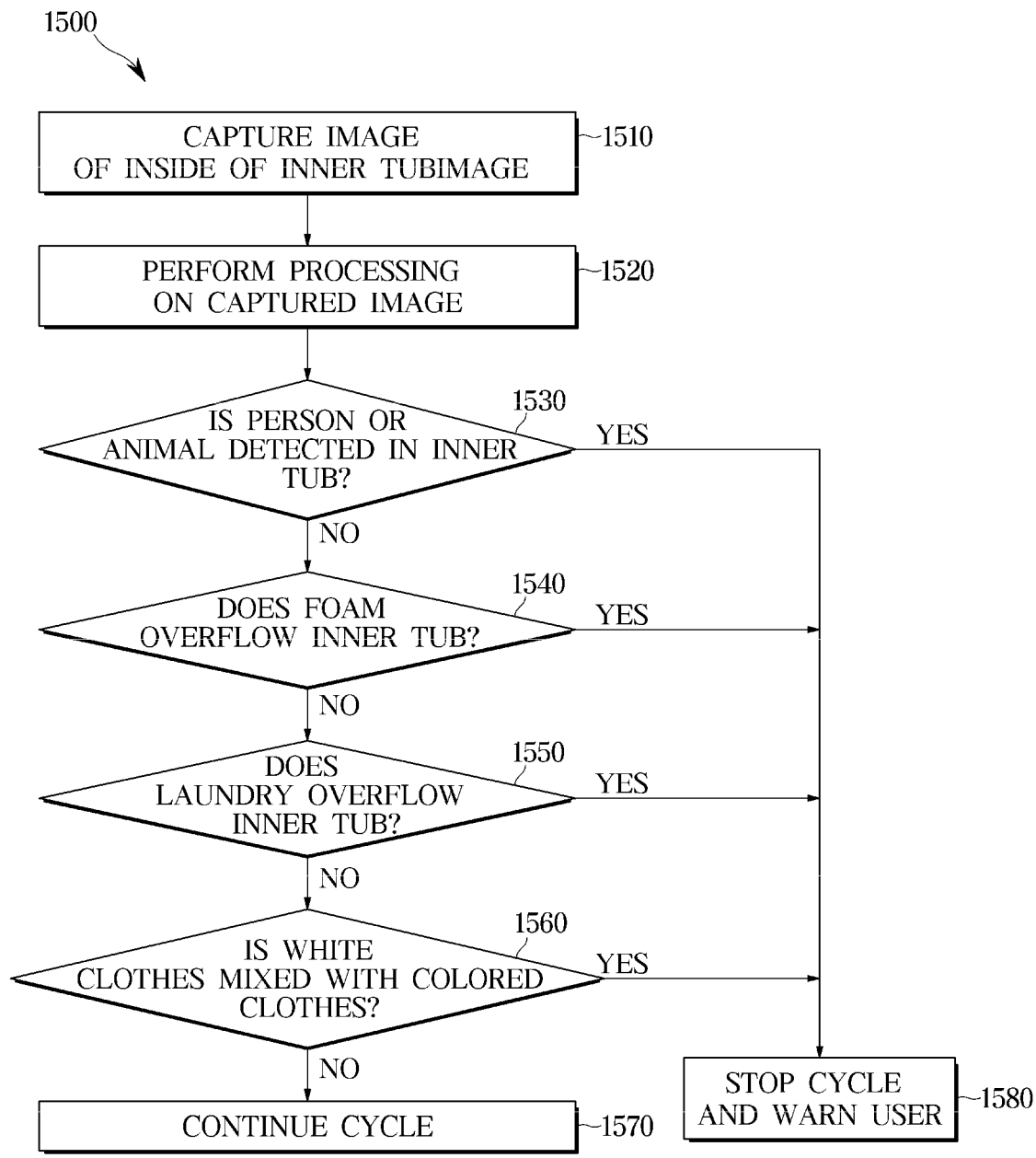
FIG. 24 illustrates a warning operation of the washing machine according to an embodiment of the disclosure.

FIG. 24 illustrates a warning operation of the washing machine according to an embodiment of the disclosure.

The washing machine 1 may perform a warning operation (1500) illustrated in FIG. 24. The warning operation (1500) of the washing machine 1 will be described with reference to FIG. 24.

The washing machine 1 capture an image of the inside of the inner tub 30 (1510).

The controller 170 may control the camera 100 to capture an image of the inside of the inner tub 30 and receive image data of the image of the inner tub 30 from the camera 100.

Operation 1510 may be the same as operation 1120 illustrated in FIG. 9, and thus a description thereof will be omitted.

The washing machine 1 processes the captured internal image (hereinafter referred to as an "image of inner tub") of the inner tub 30 (1520).

The controller 170 may directly process the image of the inner tub 30, or may process the image of the inner tub 30 using the machine learning of the second server device 202. For example, as described in FIG. 23, the controller 170 may control the communication circuitry 180 to transmit the image data of the image of the inner tub 30 and the message for identifying the inside of the inner tub 30 to the first server device 201. The controller 170 may receive identification information of an object located in the inner tub 30 from the first server device 201.

Before starting the washing, the washing machine 1 identifies whether or not a person or an animal is detected in the inner tub 30 (1530).

Before starting the washing, the controller 170 may identify whether the object, which is identified from the image of the inner tub 30, includes a person or an animal. During the door 15 is opened prior to washing, infants or companion animals may enter the inner tub 30 of the washing machine 1. The controller 170 may control the camera 100 to capture an image of the inside of the inner tub 30 before the operation of the washing machine 1, and identify whether a person or an animal is detected in the inner tub 30 based on the captured image of inner tub 30.

When a person or an animal is not detected (no in 1530), the washing machine 1 identifies whether foam of the inner tub 30 overflows the inner tub 30 during the washing (1540).

The controller 170 may identify whether or not the foam of the inner tub 30 overflows the inner tub 30 during the washing, based on the image of the inner tub 30. Some detergents generate a large amount of foam, and thus foam generated in the inner tub 30 may overflow the inner tub 30 during the washing. When the foam overflows the inner tub 30 and the outer tub 20, the foam may reach various electrical components (for example, a motor driving circuit) disposed between the cabinet 10 and the outer tub 20. Accordingly, it may cause a malfunction in the electrical components of the washing machine 1. To prevent this, the controller 170 may identify whether the foam overflows the inner tub 30 based on the processing of the image of the inner tub 30.

When the foam does not overflow the inner tub 30 (no in 1540), the washing machine 1 identifies whether the laundry of the inner tub 30 overflows the inner tub 30 during the washing (1550).

The controller 170 may identify whether or not the laundry overflows the inner tub 30 during the washing, based on the image of the inner tub 30. The laundry (for example, waterproof laundry) may collect air before the washing starts, and thus the laundry may float in water due to buoyancy. When the inner tub 30 is rotated before the laundry is sufficiently soaked with water, the laundry may overflow the inner tub 30. When the laundry overflows the inner tub 30 and the outer tub 20, the laundry may disturb the rotation of the inner tub 30 between the inner tub 30 and the outer tub 20. Therefore, the load of the motor 50 may increase, and the motor 50 may be damaged. To prevent this, the controller 170 may identify whether the laundry overflows the inner tub 30 based on the processing of the image of the inner tub 30.

When the laundry does not overflow the inner tub 30 (no in 1550), the washing machine 1 identifies whether white clothes is mixed with colored clothes (1560).

Before starting the washing, the controller 170 may identify whether the object, which is identified from the image of the inner tub 30, includes white clothes and colored clothes. When the white clothes are washed together with the colored clothes, the white clothes may be colored by the colored clothes. In order to prevent this, the controller 170 may identify whether the white clothes are mixed with the colored clothes in the inner tub 30 based on the processing of the image of the inner tub 30.

When the white clothes are not mixed with the colored clothes (no in 1560), the washing machine 1 continues the cycle for the washing (1570).

When a person or an animal is not detected in the inner tub 30, when the foam or the laundry does not overflow the inner tub 30, and when the white clothes are not mixed with the colored clothes, the washing machine 1 may continue the cycle for the washing. For example, the controller may start or continue the washing cycle (1010).

When a person or an animal is detected in the inner tub 30 (yes in 1530), when the foam overflows the inner tub 30 (yes in 1540), when the laundry overflows the inner tub 30 (yes in 1550), or when the white clothes is mixed with the colored clothes (yes in 1550), the washing machine 1 stops the ongoing process and outputs a user warning (1580).

When a condition, in which washing is not continued, occurs, the controller 170 may stop the ongoing cycle. For example, when a person or animal is detected in the inner tub 30, the controller 170 may not start the supply water of the washing cycle, and when the foam or the laundry overflows the inner tub 30, the controller 170 may stop the rotation of the inner tub 30 during the washing cycle.

The controller 170 may output a user warning to inform a user of the occurrence of the condition in which the washing is not continued. For example, the controller 170 may output sound to draw user's attention.

The controller 170 may transmit a message, which is for the first server device 201 to transmit a message requesting a user warning to the user device 300, to the first server device 201. The first server device 201 may transmit a message for generating an alarm to the user device 300 in response to the message of the washing machine 1.

As mentioned above, when the condition, in which the washing is not continued, occurs, the washing machine 1 may stop the cycle and warn a user. Accordingly, the washing machine 1 may ensure the safety of humans and/or animals, and prevent damage to the washing machine 1 caused by overflow of foam or laundry. In addition, the washing machine 1 may prevent the white clothes from being colored by the colored clothes.

Figure 25:
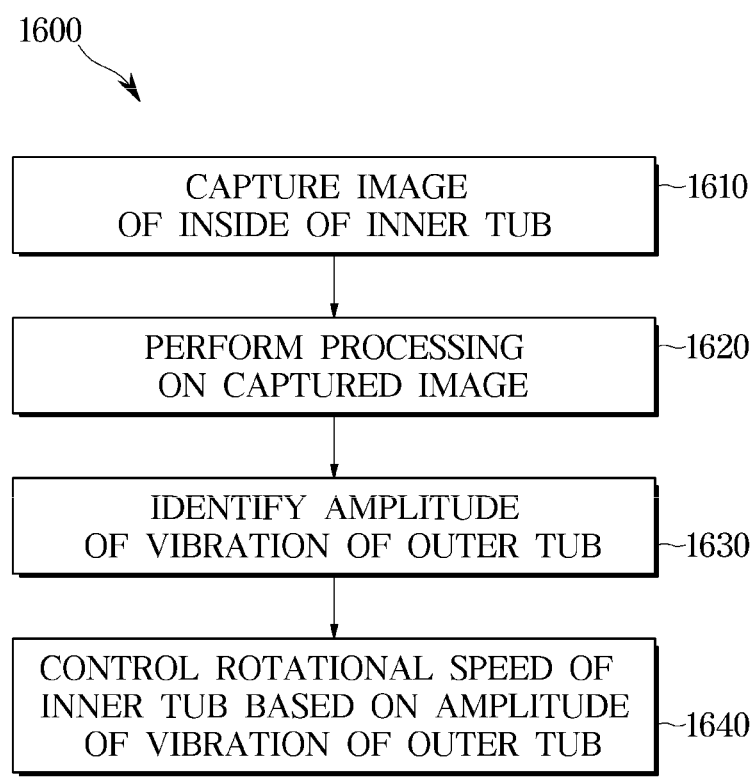
FIG. 25 illustrates a control of an inner tub rotation of the washing machine according to an embodiment of the disclosure.

FIG. 25 illustrates a control of an inner tub rotation of the washing machine according to an embodiment of the disclosure.

The washing machine 1 may perform an inner tub rotation control (1600) illustrated in FIG. 25. The inner tub rotation control (1600) of the washing machine 1 will be described with reference to FIG. 25.

The washing machine 1 captures an image of the inside of the inner tub 30 during the spinning (1610).

The controller 170 may control the camera 100 to capture an image of the inside of the inner tub 30 and receive image data of the image of the inner tub 30 from the camera 100.

Operation 1610 may be the same as operation 1120 illustrated in FIG. 9, and thus a description thereof will be omitted.

The washing machine 1 processes the captured internal image (hereinafter referred to as an "image of inner tub") of the inner tub 30 (1620).

Operation 1620 may be the same as operation 1520 illustrated in FIG. 24, and thus a description thereof will be omitted.

The washing machine 1 identifies the amplitude of the vibration of the outer tub 20 (1630).

During the spinning, the controller 170 may detect movements of the inner tub 30 and the outer tub 20 based on processing of the captured image. For example, during the spinning, the controller 170 may identify the center of the bottom of the inner tub 30 (the center of the pulsator) based on the processing of the captured image, and identify the movement of the center of the bottom of the inner tub 30.

During the rotation of the inner tub 30 for the spinning, the controller 170 may detect the vibration of the inner tub 30 and the outer tub 20 based on the movement of the center of the bottom of the inner tub 30, and the controller 170 may identify the amplitude of vibration of the inner tub 30 and the outer tub 20.

The washing machine 1 controls the rotational speed of the inner tub 30 based on the amplitude of the vibration of the outer tub 20 (1640).

The controller 170 may control the motor 50 to adjust the rotational speed of the inner tub 30 based on the amplitude of the vibration of the outer tub 20.

For example, the controller 170 may compare the amplitude of the vibration of the outer tub 20 with a reference amplitude, and when the amplitude of the outer tub 20 is greater than the reference amplitude, the controller 170 may control the motor 50 to rotate the inner tub 30 at a third rotational speed RS3. The third rotational speed may be approximately 450 rpm.

In addition, when the amplitude of the outer tub 20 is not greater than the reference amplitude, the controller 170 may control the motor 50 to rotate the inner tub 30 at a second rotational speed RS2 greater than the third rotational speeds RS3. The second rotational speed RS2 may be approximately 950 rpm.

As mentioned above, the washing machine 1 may identify the vibration of the outer tub 20 based on the internal image of the inner tub 30. When the vibration of the outer tub 20 is large, the washing machine 1 may reduce the rotational speed of the motor 50, thereby preventing damage to the washing machine 1 caused by the vibration of the inner tub 30 and the outer tub 20.

Figure 26:
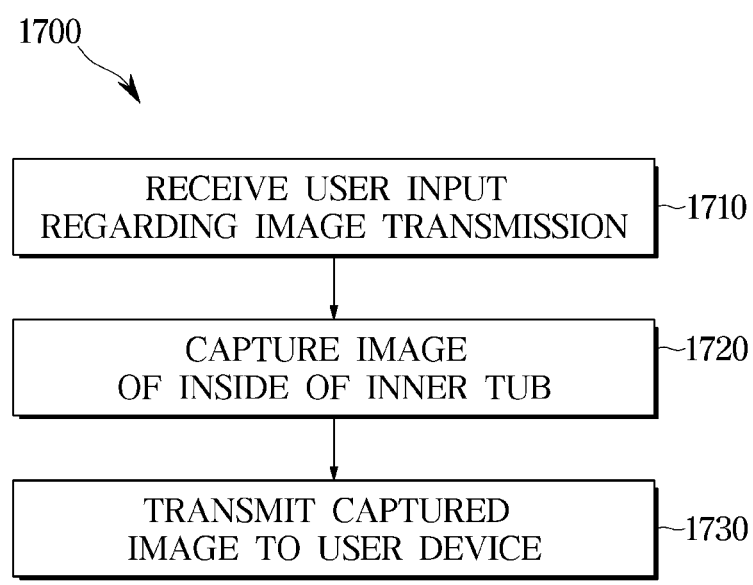
FIG. 26 illustrates transmitting of an image of an inner tub of the washing machine according to an embodiment of the disclosure.

FIG. 26 illustrates transmitting of an image of the inner tub 30 of the washing machine according to an embodiment of the disclosure.

The washing machine 1 may perform transmission of the image of inner tub 30 (1700) illustrated in FIG. 26. The image of the inner tub 30 transmission (1700) of the washing machine 1 will be described with reference to FIG. 26.

The washing machine 1 receives a user input for transmission of an internal image (hereinafter referred to as an "image of inner tub") of the inner tub 30 (1710).

A user may input a user input, which is for imaging the inside of the inner tub 30 and transmitting the captured image to the user device 300, through the user inputter 110. The controller 170 may obtain the user input for transmitting the image of the inner tub 30 through the user inputter 110.

In addition, the user may input a user input, which is for imaging the inside of the inner tub 30 and transmitting the captured image to the user device 300, through the user device 300. The controller 170 may obtain the user input for transmitting the image of the inner tub 30 through the communication circuitry 180.

The washing machine 1 captures an image of the inside of the inner tub 30 (1720).

The controller 170 may control the camera 100 to capture an image of the inside of the inner tub 30 and receive image data of the image of the inner tub 30 from the camera 100.

Operation 1720 may be the same as operation 1120 illustrated in FIG. 9, and thus a description thereof will be omitted.

The washing machine 1 transmits the captured image of inner tub 30 to the user device 300 in real time (1730).

The controller 170 may control the communication circuitry 180 to transmit the image data of the image of the inner tub 30 to the user device 300 through the first server device 201. The communication circuitry 180 may transmit the image of the inner tub 30 through the wired communication network and/or the wireless communication network in response to a control signal from the controller 170.

The first server device 201 may receive the image data of the image of the inner tub 30 from the washing machine 1 and transmit the image data of the image of the inner tub 30 to the user device 300. The user device 300 may display the image of the inner tub 30 based on the processing of the image data of the image of the inner tub 30.

As mentioned above, the washing machine 1 may capture an image of the inside of the inner tub 30 and then transmit image data of the image of the inner tub 30 to the user device 300 in real time. The user device 300 may display the received image of the inner tub 30.

The user can check the inside of the inner tub 30 through the user device 300 and can check the washing progress of the washing machine 1. In addition, the washing machine 1 may identify whether the waterproof laundry is included in the laundry based on the image of the inner tub 30, and when the laundry includes the waterproof laundry, the washing machine 1 may limit the rotational speed of the motor 50 during the spinning, through the user device 300.

The washing machine may include a cabinet provided with an opening at an upper portion thereof, an outer tub provided in the cabinet, an inner tub provided in the outer tub, a motor configured to rotate the inner tub, a camera configured to capture an image of an inside of the inner tub, and a controller configured to control the motor to increase a rotational speed of the inner tub to a first rotational speed during spinning. The controller may control the motor to limit the rotational speed of the inner tub to a second rotational speed, which is less than the first rotational speed, based on the image of the inside of the inner tub captured by the camera during the spinning. The controller may control the motor to rotate the inner tub at a third rotational speed, and the controller may control the camera to capture an image of the inside of the inner tub after the inner tub is rotated at the third rotational speed. The third rotational speed may be equal to or less than the second rotational speed.

Accordingly, the washing machine may identify laundry accommodated in the inner tub based on the internal image of the inner tub, and the washing machine may control the rotational speed of the inner tub during the spinning based on the type of the identified laundry. In addition, it is possible to prevent the washing machine from being damaged caused by the laundry accommodated in the inner tub during the spinning.

The controller may identify an arrangement of laundry accommodated in the inner tub based on a processing of the image of the inside of the inner tub. The controller may control the motor to increase the rotational speed of the inner tub to the first rotational speed in response to the arrangement of the laundry being in a ring shape. The controller may control the motor to limit the rotational speed of the inner tub to the second rotational speed in response to the arrangement of the laundry being in a circular shape.

Accordingly, the washing machine may distinguish between waterproof laundry and laundry that is not formed of a waterproof material, based on the internal image of the inner tub, and the washing machine may control the rotational speed of the inner tub during the spinning based on the waterproof laundry and the laundry that is not formed of the waterproof material. Further, during the spinning, it is possible to prevent the washing machine from being damaged caused by the waterproof laundry accommodated in the inner tub.

The controller may identify the arrangement of the laundry accommodated in the inner tub based on a difference image between an image of a bottom of the inner tub that is pre-stored and the image of the inside of the inner tub captured by the camera.

Accordingly, the washing machine may more quickly and precisely distinguish between waterproof laundry and laundry that is not formed of a waterproof material.

The washing machine may further include a communication circuitry configured to communicate with a server device. The controller may control the communication circuitry to transmit the internal image of the inner tub to the server device and the controller may receive information on the arrangement of the laundry accommodated in the inner tub from the server device through the communication circuitry.

Accordingly, using artificial intelligence server, the washing machine may distinguish between waterproof laundry and laundry that is not formed of a waterproof material.

The controller may set a region of interest (ROI) in a central portion of the image of the inside of the inner tub and the controller may control the motor to increase the rotational speed of the inner tub to the first rotational speed in response to an image of the ROI being the same as the image of the bottom of the inner tub. The controller may set a region of interest (ROI) in a central portion of the internal image of the inner tub and the controller may control the motor to limit the rotational speed of the inner tub to the second rotational speed in response to an image of the ROI being different from the image of the bottom the inner tub.

Accordingly, the washing machine may more quickly and precisely distinguish between waterproof laundry and laundry that is not formed of a waterproof material.

The camera may be provided on an inner wall of the opening, a lower side of a door, or a lower side of a detergent dispenser.

As mentioned above, the camera may be installed on a variety of position capable of imaging the inside of the inner tub.

The controller may detect a vibration of the outer tub based on the image of the inside of the inner tub captured by the camera, and the controller may control the motor to limit the rotational speed of the inner tub to the second rotational speed, which is less than the first rotational speed, in response to an amplitude of the vibration being greater than a reference amplitude.

Accordingly, it is possible to prevent the washing machine from being damaged caused by the vibration of the inner tub and the outer tub.

The controller may identify a type of laundry based on the image of the inside of the inner tub captured by the camera, and select a washing course according to the type of the laundry.

Accordingly, a user can recognize the type of the laundry and may not select the washing course. Further, by selecting a washing course suitable for the laundry, it is possible to improve the washing efficiency and prevent the damage to the laundry.

The washing machine may further include a communication circuitry configured to communicate with a user device through a server device, and the controller may control the communication circuitry to transmit the image of the inside of the inner tub to the user device through the server device in response to a user input of the user device.

Accordingly, the washing machine may provide a user with progress of the washing while the washing is performed. In addition, the user can remotely check the washing progress of the washing machine.

The controller may detect a person or an animal in the inner tub based on the processing of the image of the inside of the inner tub, and the controller may output a user warning in response to detecting the person or animal in the inner tub.

Accordingly, it is possible to prevent an accident in which the washing is performed in a state in which a child or a companion animal is accommodated in the inner tub of the washing machine.

The controller may detect foam or laundry separated from the inner tub based on the processing of the image of the inside of the inner tub, and the controller may output a user warning in response to detecting foam or laundry separated from the inner tub.

Accordingly, it is possible to prevent electronic components from being damaged caused by the foam of the inner tub that overflows out of the outer tub.

The controller may detect white clothes mixed with colored clothes based on an image processing of the image of the inside of the inner tub, and the controller may output a user warning in response to detecting the white clothes mixed with the colored clothes.

Accordingly, it is possible to prevent an accident in which laundry is colored by another laundry.

As is apparent from the above description, the washing machine may identify whether laundry of an inner tub includes waterproof clothing.

The washing machine may include a camera configured to captured an image of an inside of an inner tub, and may identify whether laundry of the inner tub includes waterproof clothing based on image data of the image of the inner tub 30 captured by the camera.

The washing machine may reduce a rotational speed of an inner tub during a spinning cycle when laundry of the inner tub includes waterproof clothing.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A washing machine comprising:
    a cabinet with an opening at an upper portion thereof;
    an outer tub disposed inside the cabinet;
    an inner tub disposed inside the outer tub;
    a motor configured to rotate the inner tub;
    a camera configured to capture an image of an inside of the inner tub; and
    a controller configured to control the motor to perform spinning cycle and set a maximum rotational speed of the inner tub during the spinning cycle,
    wherein the controller is configured to:
        in response to the spinning cycle being started, control the motor to increase a rotational speed of the inner tub,
        in response to the rotational speed of the inner tub reaching a first rotational speed, obtain information of an arrangement of laundry inside of the inner tub based on comparison of the image of the inside of the inner tub captured by the camera with a pre-stored reference image,
        in response to determining a first arrangement of laundry from the information of the arrangement of laundry based on the image of the inside of the inner tub captured by the camera being similar with the pre-stored reference image, set the maximum rotational speed as a first maximum rotational speed, and
        in response to determining a second arrangement of laundry from the information of the arrangement of laundry based on the image of the inside of the inner tub captured by the camera being not similar with the pre-stored reference image, set the maximum rotational speed as a second maximum rotational speed, which is different from the first maximum rotational speed.

2. The washing machine of claim 1, wherein
    in response to the rotational speed of the inner tub reaching the first rotational speed, the controller is configured to control the camera to capture the image of the inside of the inner tub.

3. The washing machine of claim 1, wherein
    the controller is configured to identify the arrangement of laundry accommodated in the inner tub based on processing of image data of the image of the inside of the inner tub captured by the camera for the comparison with the pre-stored reference image.

4. The washing machine of claim 3, wherein
    the controller is further configured to set the maximum rotational speed as the first maximum rotational speed in response to the arrangement of the laundry being identified as fully aligned all along an outer edge portion of the inside of the inner tub based on a processing of the image of the inside of the inner tub.

5. The washing machine of claim 3, wherein
    the controller is further configured to set the maximum rotational speed as the second maximum rotational speed in response to the arrangement of the laundry being identified as substantially spread all over the inside of the inner tub based on a processing of the image of the inside of the inner tub.

6. The washing machine of claim 3, further comprising:
    a communication circuitry configured to communicate with a server device,
    wherein the controller is configured to control the communication circuitry to transmit the image of the inside of the inner tub to the server device and the controller is configured to receive information on the arrangement of the laundry accommodated in the inner tub from the server device through the communication circuitry.

7. The washing machine of claim 1, wherein the pre-stored reference image comprises an image of a bottom of the inner tub,
    wherein the controller is configured to set a region of interest (ROI) in a central portion of the image of the inside of the inner tub and set the maximum rotational speed as the first maximum rotational speed in response to the image at the ROI being same as the image of a bottom of the inner tub.

8. The washing machine of claim 1, wherein the pre-stored reference image comprises an image of a bottom of the inner tub,
    wherein the controller is configured to set a region of interest (ROI) in a central portion of the image of the inside of the inner tub and set the maximum rotational speed as the second maximum rotational speed in response to the image at the ROI being different from the image of a bottom of the inner tub.

9. The washing machine of claim 1, wherein the camera is provided at one of:
- an inner wall of the opening,
- a lower side of a door configured to open and close the opening, and
- a lower side of a detergent dispenser configured to supply detergent to the inner tub.

10. A washing machine comprising:
- a cabinet with an opening at an upper portion thereof;
- an outer tub disposed inside in the cabinet;
- an inner tub disposed inside the outer tub;
- a motor configured to rotate the inner tub;
- a camera configured to capture an image an inside of the inner tub;
- a processor electrically connected to the camera and the motor; and
- a memory configured to store at least one instruction configured to cause the processor to:
  - in response to a spinning cycle being started, control the motor to increase a rotational speed of the inner tub,
  - in response to the rotational speed of the inner tub reaching a first rotational speed, obtain information of an arrangement of laundry inside of the inner tub based on comparison of the image of the inside of the inner tub captured by the camera with a pre-stored reference image,
  - in response to determining a first arrangement of laundry from the information of the arrangement of laundry based on the image of the inside of the inner tub captured by the camera being similar with the pre-stored reference image, set a maximum rotational speed during the spinning cycle as a first maximum rotational speed, and
  - in response to determining a second arrangement of laundry from the information of the arrangement of laundry based on the image of the inside of the inner tub captured by the camera being not similar with the pre-stored reference image, set the maximum rotational speed as a second maximum rotational speed, which is different from the first maximum rotational speed.

* * * * *